(12) United States Patent
Fujiuchi et al.

(10) Patent No.: US 9,676,049 B2
(45) Date of Patent: Jun. 13, 2017

(54) ARC WELDING METHOD, ARC WELDING DEVICE AND ARC WELDING MAGNETIC FIELD STRENGTH ADJUSTMENT METHOD

(75) Inventors: Hiroki Fujiuchi, Tochigi (JP); Tetsuya Kodama, Tochigi (JP); Toshiyuki Horimukai, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 796 days.

(21) Appl. No.: 13/700,813

(22) PCT Filed: Jun. 1, 2011

(86) PCT No.: PCT/JP2011/062618
§ 371 (c)(1),
(2), (4) Date: Feb. 5, 2013

(87) PCT Pub. No.: WO2011/152465
PCT Pub. Date: Dec. 8, 2011

(65) Prior Publication Data
US 2013/0126501 A1    May 23, 2013

(30) Foreign Application Priority Data

Jun. 2, 2010 (JP) ................................. 2010-127185
Dec. 28, 2010 (JP) ................................. 2010-292983
Dec. 28, 2010 (JP) ................................. 2010-292984

(51) Int. Cl.
*B23K 9/08* (2006.01)
*B23K 10/02* (2006.01)
(Continued)

(52) U.S. Cl.
CPC ............... *B23K 9/08* (2013.01); *B23K 10/02* (2013.01); *B23K 37/0408* (2013.01);
(Continued)

(58) Field of Classification Search
CPC ...... B23K 9/08; B23K 10/02; B23K 37/0408; B23K 37/0461; B23K 37/0443
(Continued)

(56) References Cited

U.S. PATENT DOCUMENTS 2,702,846 A * 2/1955 Breymeier ............... 219/74
3,495,066 A * 2/1970 Guetet ............... B23K 9/173
219/137 R
(Continued)

FOREIGN PATENT DOCUMENTS

JP    56-147973    11/1981
JP    57-028695     2/1982
(Continued)

OTHER PUBLICATIONS

Notice of Reasons for Rejection issued to JP Application No. 2010-127185, mailed Nov. 12, 2013, 2 pages.
(Continued)

*Primary Examiner* — Thien S Tran
(74) *Attorney, Agent, or Firm* — Rankin, Hill & Clark LLP

(57) ABSTRACT

A magnetic field is generated in a workpiece in a direction orthogonal to the joining direction, and as a result of the Lorentz force resulting from the magnetic field and the current between the plasma torch and the workpiece, the front tip side of the arc is bent forward in the direction of advancement of the plasma torch and welding is performed. The magnetic field strength of the welded part is adjusted by changing the relative positions of the plasma torch and a butting portion of the workpiece.

12 Claims, 21 Drawing Sheets

(51) Int. Cl.
*B23K 37/04* (2006.01)
*B23K 101/18* (2006.01)
*H05H 1/40* (2006.01)
*H05H 1/34* (2006.01)

(52) U.S. Cl.
CPC ...... *B23K 37/0443* (2013.01); *B23K 37/0461* (2013.01); *B23K 2201/18* (2013.01); *H05H 1/40* (2013.01); *H05H 2001/3494* (2013.01)

(58) Field of Classification Search
USPC ................ 219/61, 73, 11, 73.21, 123, 137 R
See application file for complete search history.

(56) References Cited

U.S. PATENT DOCUMENTS 3,551,637 A * 12/1970 Lampson ............. B23K 9/0737
219/123
6,617,547 B1 * 9/2003 Abdurachmanov .......... 219/123

FOREIGN PATENT DOCUMENTS

| | | |
|---|---|---|
| JP | 61-206566 | 9/1986 |
| JP | 2-133195 | 5/1990 |
| JP | 2005-211919 | 8/2005 |
| JP | 2007-061830 | 3/2007 |

OTHER PUBLICATIONS

Notice of Reasons for Rejection issued to JP Application No. 2010-292984, mailed Nov. 12, 2013, 2 pages.

* cited by examiner

ARC WELDING METHOD, ARC WELDING DEVICE AND ARC WELDING MAGNETIC FIELD STRENGTH ADJUSTMENT METHOD

TECHNICAL FIELD

The present invention relates to an arc welding method, arc welding device and an arc welding magnetic field strength adjustment method. In more detail, it relates to a plasma arc welding method, a plasma arc welding device and a magnetic field strength adjustment method for plasma arc welding.

BACKGROUND ART

Arc welding has been known from convention. In arc welding, when the feed rate of the arc torch quickens, the arc runs behind in the direction of advancement of the arc torch, and a phenomenon occurs in which heat does not penetrate the workpiece. In this case, welding is carried out while the workpiece remains not sufficiently preheated, which is a cause of welding defects.

In order to resolve the above-mentioned phenomenon, for example, technology has been proposed that causes the arc A to swing forwards in the direction of advancement of an arc torch 100, using the Lorentz force F (shown by F in FIG. 28) produced by causing a magnetic field in a direction orthogonal to the joining direction (shown by B in FIG. 28) to act on the arc A extending from the leading end of the nozzle of the arc torch 100 to the workpiece W, as shown in FIGS. 27 and 28 (refer to Patent Document 1).

Patent Document 1: Japanese Unexamined Patent Application, Publication No. S61-206566

DISCLOSURE OF THE INVENTION

Problems to be Solved by the Invention

However, since the Lorentz force F acts on the whole area from the upper end to lower end of the arc A with the technology described in Patent Document 1, as shown in FIG. 28, the arc A will bend forwards in the direction of advancement from the based side.

Then, this bent arc A comes to burn the nozzle itself, and the leading end of the nozzle is consumed; therefore, the replacement frequency of the leading end tip rises.

In addition, by the arc A bending forwards from the base side to the direction of advancement, the arc A floats from the workpiece W, and the heat input region becomes shallow; therefore, the amount of heat input ultimately declines.

However, the amount of the arc A swung forward in the direction of advancement changes depending on the feed rate of the arc torch 100. For this reason, in order to sufficiently preheat the workpiece W, it is necessary to adjust the magnetic field strength at the welded part depending on the feed rate of the arc torch 100. For example, in a case of quickening the feed rate of the arc torch 100, the amount of the arc A swung forward in the direction of advancement decreases; therefore, it is necessary to raise the magnetic field strength at the welded part.

In addition, upon butt welding workpieces having different plate thicknesses, the magnetic flux leaked to the surface of the butting portion of the workpieces W changes depending on the plate thickness difference thereof, and the amount of the arc A swung forward in the direction of advancement changes. For this reason, it is necessary to adjust the magnetic field strength at the welded part depending on the plate thickness difference. For example, since the magnetic flux leaked to the surface of the butting portion decreases in a case of reducing the plate thickness difference, it is necessary to raise the magnetic field strength at the welded part.

In addition, the welding current necessary for melting differs depending on the plate thickness of the workpiece W, and the amount of the arc A swung forwards in the direction of advancement changes according to the magnitude of the welding current. For this reason, it is necessary to adjust the magnetic field strength at the welded part depending on the plate thickness of the workpiece W. For example, in a case thickening the plate thickness of the workpiece W, it is necessary to raise the magnetic field strength at the welded part due to increasing the welding current.

Methods providing electromagnets, a power source, a controller, etc. and adjusting the excitation current are common as methods for adjusting the magnetic field strength. However, with this method, there have been problems in that, in addition to the cost increasing, the size of device also increases. In particular, there has been a problem in that, in a case of attaching these to an arc torch, the size of the processing part increases and maneuverability is lost.

An object of the present invention is to provide an arc welding method and an arc welding device that can ensure the necessary amount of heat input to a workpiece while reducing the consumption of the nozzle leading end, and raise the welding speed, by bending only the leading end side of the arc forwards in the direction of advancement.

In addition, an object of the present invention is to provide technology for arc welding employing magnetic fields that enables adjustment of the magnetic field strength at a welded part, while avoiding a cost increase and device size increase.

Means for Solving the Problems

An arc welding method of the present invention is a method of arc welding using an arc torch (e.g., the plasma torch 10, 40 described later) to conduct arc welding on a workpiece (e.g., the workpiece W described later), the method including: generating, inside of the workpiece, a magnetic field (e.g., the magnetic field B described later) in a direction substantially orthogonal to a joining direction in which the arc torch advances; and welding by bending a leading end side of an arc (e.g., the arc A described later) forwards in a direction of advancement of the arc torch by way of Lorentz force (e.g., the Lorentz force F described later) resulting from current (e.g., the current I described later) flowing between the arc torch and the workpiece, and the magnetic field.

According to the present invention, by generating the magnetic field inside of the workpiece, the location at which the magnetic field is strongest is inside of the workpiece, and the magnetic field becomes weaker as distancing from the workpiece. Therefore, the Lorentz force bending the arc becomes stronger as approaching the workpiece, and weaker as approaching the arc torch. For this reason, it is possible to bend only the leading end side of the arc forwards in the joining direction, and it is possible to ensure the necessary amount of heat input to a workpiece while reducing the consumption of the nozzle leading end, and raise the welding speed.

In this case, it is preferable to generate the magnetic field d by disposing magnets (e.g., the electromagnet 21, electromagnet 22 and permanent magnet 23 described later) on both sides of a joining line of the workpiece at positions at which an influence by magnetism acting inside of the workpiece is greater than an influence acting on the arc.

According to the present invention, it is possible to effectively generate a magnetic field inside of the workpiece.

In this case, it is preferable to conduct the arc welding in a state fixing the workpiece to a non-magnetic jig (e.g., the clamp 34 and base 32 described later).

According to the present invention, by fixing the workpiece in a non-magnetic jig, it is possible to make the flow of magnetic flux of the magnetic field generated inside of the workpiece to converge on the workpiece that is a magnetic substance. In other words, since the magnetic flux of the magnetic field generated inside of the workpiece is prevented from escaping to locations other than the workpiece, it is possible to effectively raise the magnetic flux density of the magnetic flux flowing within the workpiece.

In this case, it is preferable to process at a temperature at which a welded part of the workpiece exceeds the Curie point.

According to the present invention, since the welded part of the workpiece is processed at a temperature exceeding the Curie point, the welded portion becomes non-magnetic and it becomes difficult for magnetic flux to pass. For this reason, the magnetic flux of the generated magnetic field inside of the workpiece goes around to a portion ahead of the welded part, which is also a magnetic substance due to not having reached the Curie point, and the magnetic flux collects. Therefore, the magnetic flux of the generated magnetic field inside of the workpiece may be even lower.

An arc welding device of the present invention (e.g., the plasma arc welding devices 1 to 6 described later) includes: an arc torch (e.g., the plasma torch 10, 40 described later) that conducts arc welding on a workpiece (e.g., the workpiece W described later); and a magnetic field generating mechanism (e.g., the magnetic field generating member 20, electromagnet 22 and permanent magnet 23 described later) that generates, inside of the workpiece, a magnetic field (e.g., the magnetic field B described later) in a direction orthogonal to a joining direction in which the arc torch advances, the magnetic field bending a leading end side of an arc (e.g., the arc A described later) forwards in a direction of advancement of the arc torch, by way of Lorentz force (e.g., the Lorentz force F described later) resulting from the magnetic field and current (e.g., the current I described later) flowing between the arc torch and the workpiece.

Furthermore, in this case, it is preferable to further include a non-magnetic jig (e.g., the clamp 34 and base 32 described later) that fixes the workpiece.

According to the present invention, similar effects to the case of the above-mentioned arc welding method can be obtained.

Furthermore, the present invention provides a method for adjusting the magnetic field strength at a welded part in the arc welding (e.g., plasma arc welding by the plasma arc welding device 5, 6 described later) to weld a butting workpiece (e.g., the workpiece W described later) by an arc torch (e.g., the plasma torch 10, 40 described later), when generating inside of the workpiece a magnetic field (e.g., the magnetic field B described later) in a direction orthogonal to a joining direction in which the arc torch advances, and arc welding by bending a leading end side of an arc (e.g., the arc A described later) forwards in a direction of advancement of the arc torch, by way of Lorentz force (e.g., the Lorentz force F described later) resulting from current (e.g., the current I described later) flowing between the arc torch and the workpiece, and the magnetic field. The arc welding magnetic field strength adjustment method according to the present invention adjusts the magnetic field strength at the welded part by changing the relative positions between the arc torch and the butting portion of the workpiece.

The present invention adjusts the magnetic field strength at the welded part in arc welding employing a magnetic field, by changing the relative positions between the arc and the butting portion of the workpiece. In other words, since adjustment of the magnetic flux origin is not performed, it is not necessary to provide electromagnets, a power source or a controller, and it is possible to use smaller and inexpensive permanent magnets in place of these. Therefore, according to the present invention, the magnetic field strength at the arc welded part can be easily adjusted by only changing the relative positions between the arc torch and the butting portion of the workpiece, while avoiding cost increases and increases in device size.

In addition, since only the relative positions between the arc torch and the butting portion of the workpiece are changed, the magnetic field strength at the welded part can be easily adjusted depending on the plate thickness and set of plates of the workpiece, welding speed, etc., and favorable welding becomes possible.

Furthermore, the magnetic field strength adjustment method according to the present invention is particularly preferably applied to plasma art welding in which the bead width is wide and there is tolerance in the aiming position of the arc torch in the plate width direction.

Effects of the Invention

According to the present invention, it is possible to ensure the necessary amount of heat input to a workpiece while reducing the consumption of the nozzle leading end, and raise the welding speed, by bending only the leading end side of the arc forwards in the direction of advancement. In particular, in a case of using a non-magnetic jig, it is possible to obtain this effect with less magnetic flux.

In addition, according to the present invention, in arc welding employing magnetic fields, it is possible to adjust the magnetic field strength at a welded part, while avoiding a cost increase and device size increase.

Figure 1:
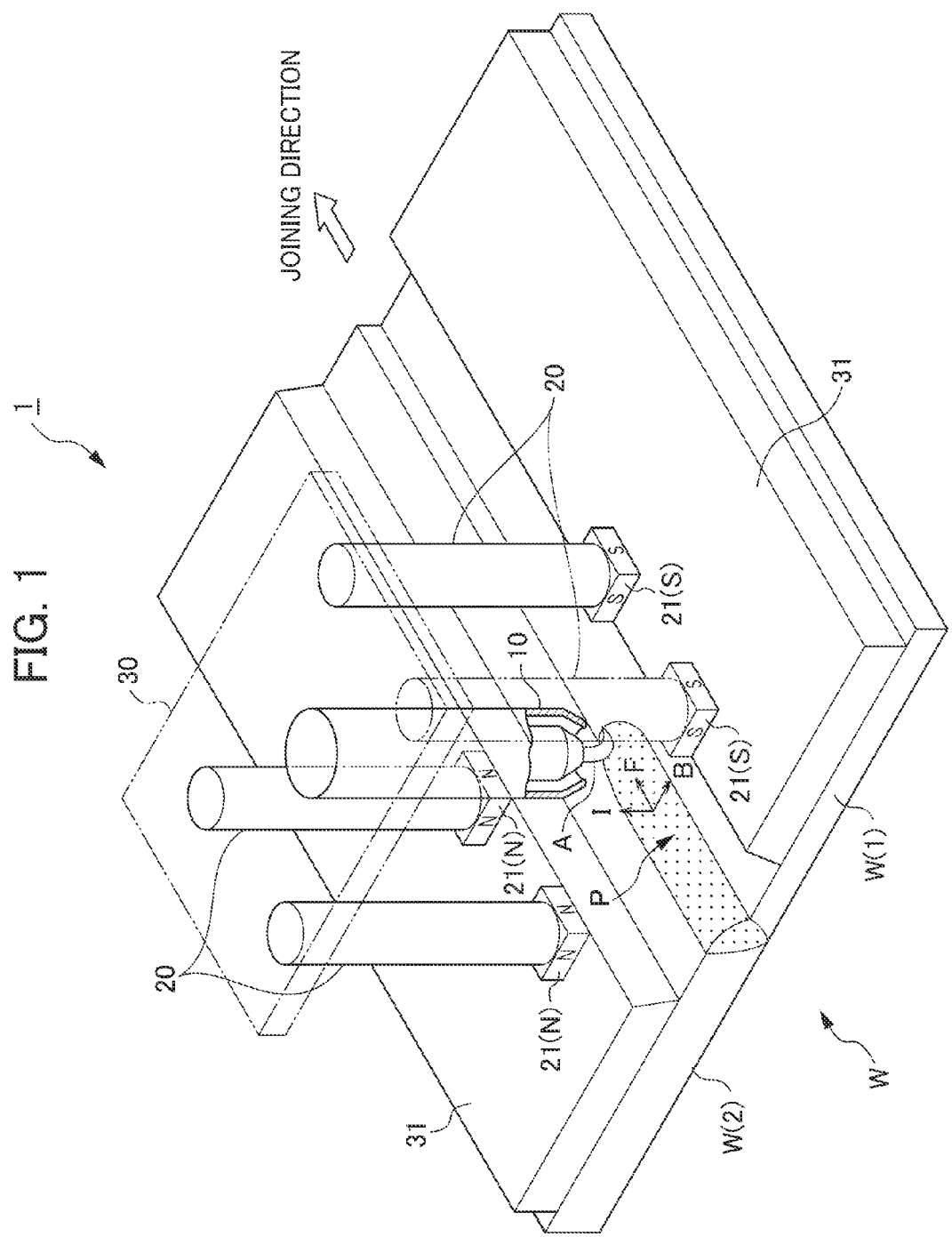
FIG. 1 is a perspective view of a plasma arc welding device according to a first embodiment.

EXPLANATION OF REFERENCE NUMERALS 1-6 plasma arc welding device (arc welding device)
10, 40 plasma torch (arc torch)
20 magnetic field generating member (magnetic field generating mechanism)
22N1, 22N2, 22S1, 22S2 electromagnet (magnetic field generating mechanism)
23N, 23S permanent magnet (magnetic field generating mechanism)
32 base (jig)
34 clamp (jig)
A arc
B magnetic field
I current
F Lorentz force
W workpiece

PREFERRED MODE FOR CARRYING OUT THE INVENTION

Hereinafter, embodiments of the present invention will be explained while referencing the drawings. It should be noted that, in the explanations of the second embodiment and later, for configurations similar to a plasma arc welding device according to an embodiment that has already been explained, the same reference symbols will be appended, and otherwise redundant explanations will be omitted.

First Embodiment

FIG. 1 is a perspective view of a plasma arc welding device 1 serving as an arc welding device according to a first embodiment of the present invention.

The plasma arc welding device 1 forms a tailored blank material by butt welding a workpiece W. FIG. 1 shows butt welding between a workpiece W(1) having a plate thickness that is relatively thin, and a workpiece W(2) having a plate thickness that is thicker than the workpiece W(1).

In other words, the butting portion between the workpiece W(1) and the workpiece W(2) is welded by the plasma arc welding device 1. Therefore, the site of this butting portion that is welded is called "welded part" as appropriate.

As shown in FIG. 1, the plasma arc welding device 1 includes a plasma torch 10 serving as an arc torch, a magnetic field generating member 20 serving as a magnetic field generating mechanism, and a support frame 30.

Figure 2:
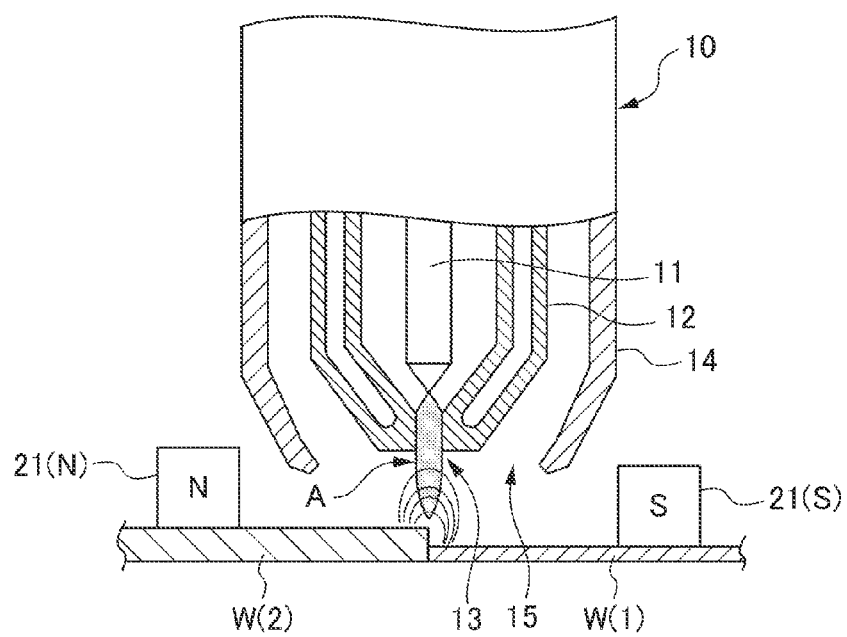
FIG. 2 is a front view schematically showing the plasma arc welding device according to the first embodiment.

FIG. 2 is a front view schematically showing the plasma arc welding device 1.

As shown in FIG. 2, the plasma torch 10 includes a rod-shaped electrode 11, a first nozzle 12 of cylindrical shape that is provided to surround this electrode 11 and ejects plasma gas, and a second nozzle 14 of cylindrical shape that is provided to surround this first nozzle 12 and ejects shield gas.

A first ejection hole 13 of circular shape is formed in a leading end of the first nozzle 12, and plasma gas ejects through this first ejection hole 13.

A second ejection hole 15 of annular shape is formed in the leading end of the second nozzle 14, and shield gas ejects through this second ejection hole 15.

The second ejection hole 15 of the second nozzle 14 is positioned more to a leading end side in the axial direction of the electrode 11 than the first ejection hole 13 of the first nozzle 12.

Referring back to FIG. 1, the magnetic field generating member 20 generates, inside of the workpiece W, a magnetic field B that bends the leading end side of an arc A forwards in the direction of advancement of the plasma torch 10.

Figure 3:
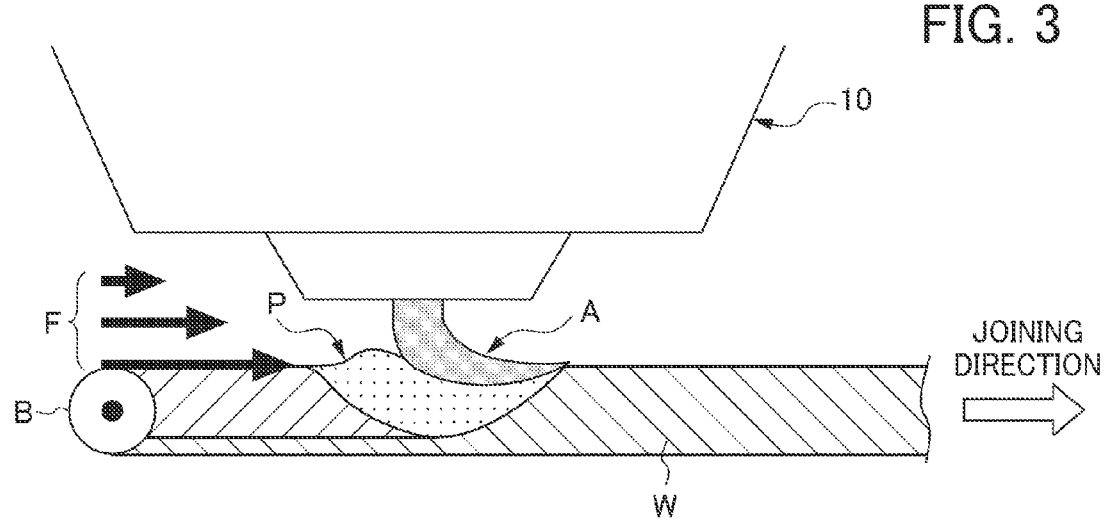
FIG. 3 is a right-side view of the plasma arc welding device shown in FIG. 2.

The magnetic field B generated by the magnetic field generating member 20 inside of the workpiece W is a magnetic field in a direction orthogonal to the direction of advancement of the plasma torch 10 (joining direction). As shown in FIG. 3, which is a right-side view of the plasma arc welding device 1, the leading end side of the arc A is bent forwards in the direction of advancement of the plasma torch 10 by way of the Lorentz force F resulting from the magnetic field B and the current I flowing between the plasma torch 10 and the workpiece W.

Referring back to FIG. 1, the magnetic field generating member 20 includes four electromagnets 21 as magnets at a lower end thereof. In a plan view, these electromagnets 21 are arranged in front, back and left and right centering around the plasma torch 10 positioned just above the butting portion butt welding the workpiece W(1) and the workpiece W(2), so as to surround the plasma torch 10.

In other words, on one side (e.g., left side) of the butting portion facing the direction of advancement of the plasma torch 10 (joining direction), two n-pole electromagnets 21(N) are arranged in front and back in the joining direction.

On the other side (e.g., right side) of the butting portion facing the direction of advancement of the plasma torch 10 (joining direction), two s-pole electromagnets 21(S) are arranged in front and back in the joining direction.

The electromagnet 21(N) and electromagnet 21(S) at the front in the joining direction are arranged to oppose each other in a plane orthogonal to the extending direction of the butting portion (joining line). For this reason, the direction of the magnetic field B from the electromagnet 21(N) towards the electromagnet 21(S) at the front in the joining direction is orthogonal to the extending direction of the butting portion (joining line).

Similarly, the electromagnet 21(N) and electromagnet 21(S) at the rear in the joining direction are arranged to oppose each other in a plane orthogonal to the extending direction of the butting portion (joining line).

For this reason, the direction of the magnetic field B from the electromagnet 21(N) towards the electromagnet 21(S) at the rear in the joining direction is orthogonal to the extending direction of the butting portion (joining line).

The support frame 30 includes a clamp 31 that retains an upper surface of the workpiece W. The support frame 30 supports the four electromagnets 21 of the magnetic field generating member 20, and the plasma torch 10 positioned at the center of these, with the clamp 31.

In other words, the four electromagnets 21 have a lower end surface thereof supported by the support frame 30 at a height separating with a small gap between the upper surface of the clamp 31.

The plasma torch 10 is supported by the support frame 30 at a predetermined height whereby the arc A extending from the lower end thereof welds the butting portion of the workpiece W.

The distance between each electromagnet 21 and the plasma torch 10 and the gap between each electromagnet 21 and the clamp 31 are set so that the magnetic force generated from each electromagnet 21 excites the workpiece W through the clamp 31 without substantially affecting the arc A of the plasma torch 10.

Next, plasma arc welding using the plasma arc welding device 1 will be explained while referencing FIGS. 2 and 3.

First, electric current is passed through the four electromagnets 21 to cause a magnetic field from the electromagnet (N) towards the electromagnet (S) at the front in the joining direction to generate, as well as a magnetic field from the electromagnet (N) towards the electromagnet (S) at the rear in the joining direction to generate. The direction of this magnetic field B (refer to FIG. 1) goes from left to right on the page in FIG. 2, and goes from in the page to out of the page orthogonally to the page in FIG. 3.

In addition, plasma gas is made to eject from the first ejection hole 13 of the first nozzle 12, while the arc A is generated by applying voltage between the electrode 11 and the workpieces W(1) and W(2). In addition, shield gas is made to eject from the second ejection hole 15 of the second nozzle 14 so as to surround the periphery of the arc A.

Then, the leading end side of the arc A is bent forwards in the direction of advancement of the plasma torch 10 by the Lorentz force F resulting from the direction of the current I flowing in the arc A (refer to FIG. 1) and the direction of the magnetic field B (refer to FIG. 1) leaked from the butting portion of the workpiece W (refer to FIG. 1).

In this state, when the plasma torch 10, i.e. arc A, is made to move in the joining direction, favorable welding is performed, while a molten pool P ensuring sufficient penetration depth is formed.

There are the following such effects according to the present embodiment.

(1-1) By generating the magnetic field B inside of the workpiece W, the location at which the magnetic field B is strongest is inside of the workpiece W, and the magnetic field B becomes weaker as distancing from the workpiece W. Therefore, the Lorentz force F bending the arc A becomes stronger as approaching the workpiece W, and weaker as approaching the plasma torch 10. For this reason, it is possible to bend only the leading end side of the arc A forwards in the joining direction.

(1-2) Since it is possible to bend only the leading end side of the arc A forwards in the joining direction, a deep heat input region is obtained without the arc A floating from the workpiece W, as in the case of the arc A bending from the base side, for example. For this reason, it is possible to ensure sufficient penetration depth.

(1-3) Since it is possible to only bend the leading end side of the arc A forwards in the joining direction, and yet ensure sufficient penetration depth, a sufficient amount of heat input of the arc A forwards in the joining direction can be ensured. For this reason, it is possible to raise the welding speed.

(1-4) Since it is possible to bend only the leading end side of the arc A forwards in the joining direction, the bent arc A will not burn the nozzle itself, and damage will not be caused to the nozzle, as in a case of the arc A bending from the base side, for example. For this reason, it is possible to reduce the consumption of the nozzle leading end.

Second Embodiment

Figure 4:
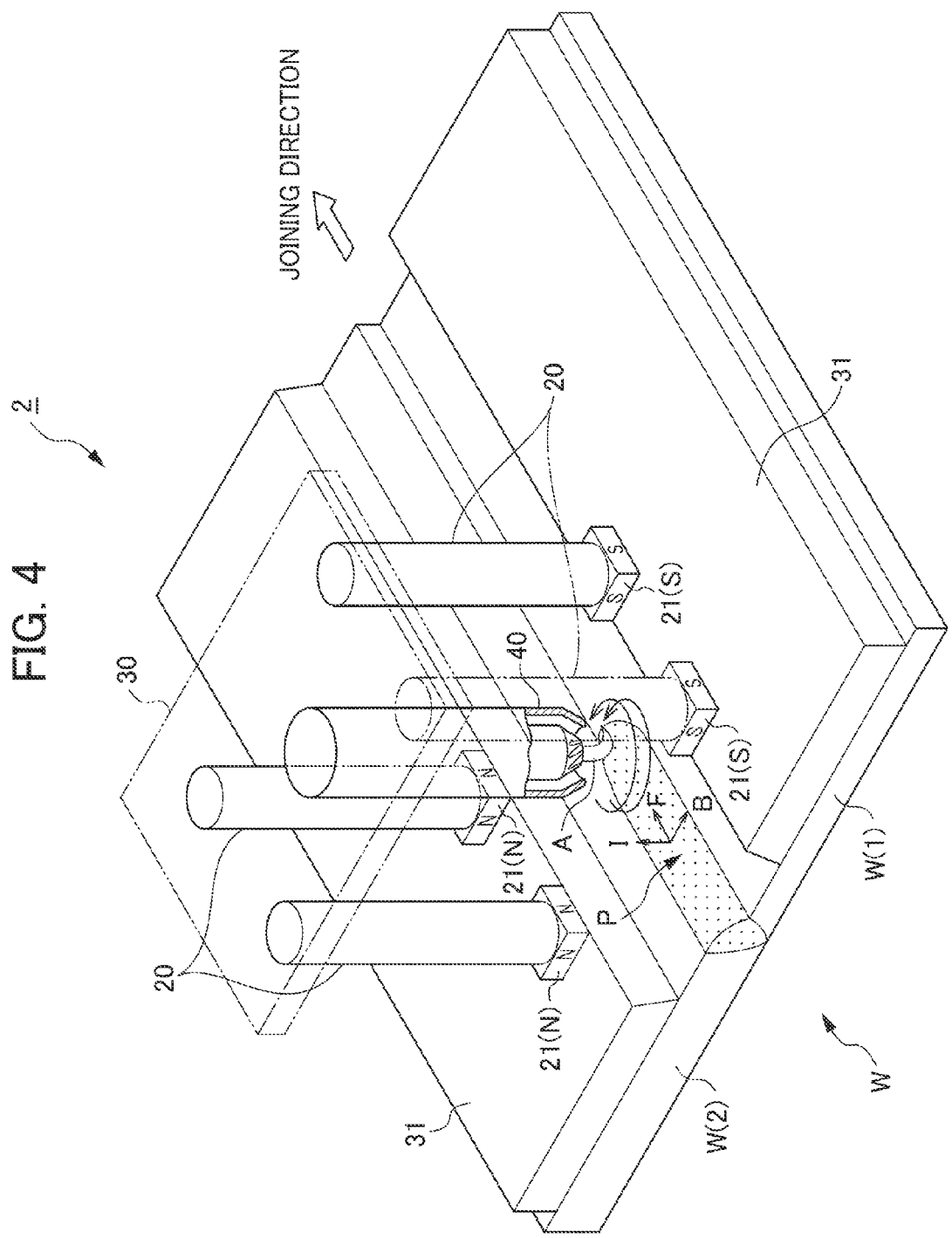
FIG. 4 is a perspective view of a plasma arc welding device according to a second embodiment.

FIG. 4 is a perspective view of a plasma arc welding device 2 serving as an arc welding device according to a second embodiment of the present invention.

The plasma arc welding device 2 includes a plasma torch 40 serving as an arc torch, a magnetic field generating member 20 serving as a magnetic field generating mechanism, and a support frame 30.

Figure 5:
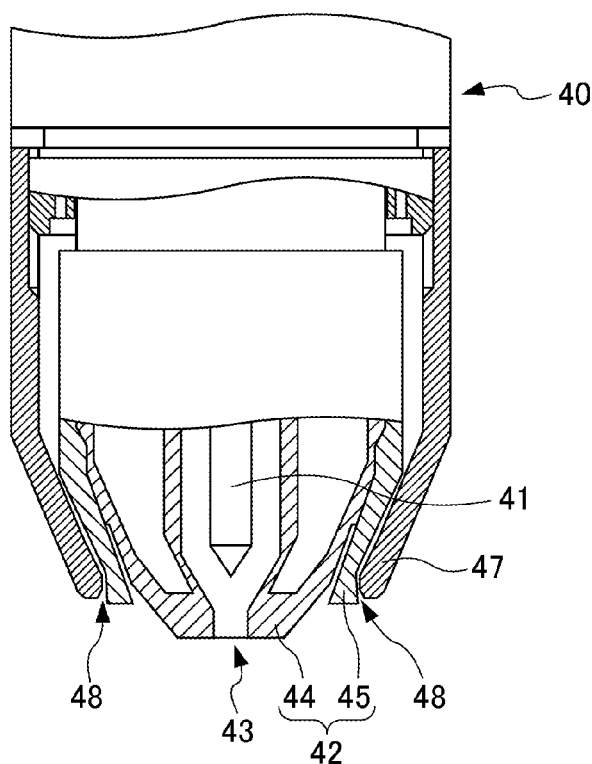
FIG. 5 is a cross-sectional view of a plasma torch of the plasma arc welding device according to the second embodiment.

FIG. 5 is a cross-sectional view of the plasma torch 40 of the plasma arc welding device 2.

As shown in FIG. 5, the plasma torch 40 includes a rod-shaped electrode 41, a first nozzle 42 of cylindrical shape that is provided to surround this electrode 41 and ejects plasma gas, and a second nozzle 47 of cylindrical shape that is provided to surround this first nozzle 42 and ejects shield gas.

A first ejection hole 43 of circular shape is formed in a leading end of the first nozzle 42, and plasma gas ejects through this first ejection hole 43.

This first nozzle 42 includes an inner cylinder part 44 of cylindrical shape, and an outer cylinder part 45 provided to surround this inner cylinder part 44.

Figure 6:
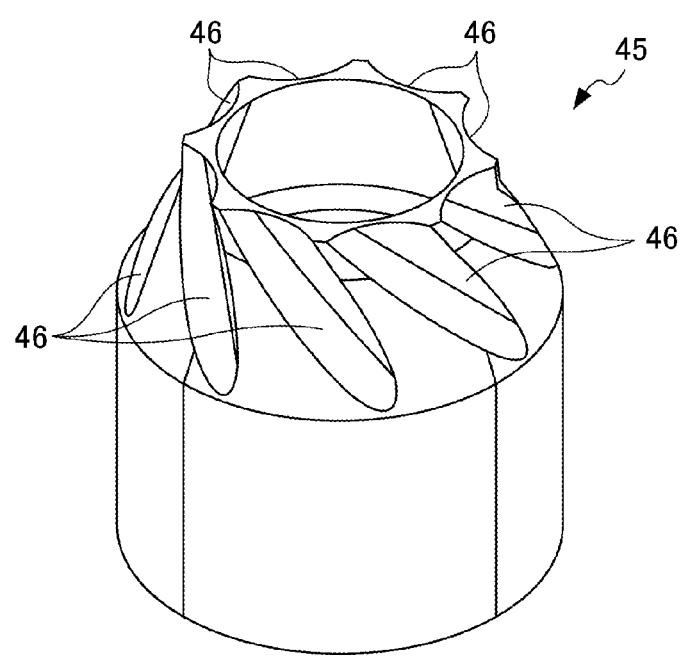
FIG. 6 is a perspective view of a first nozzle of the plasma torch of the plasma arc welding device according to the second embodiment.

FIG. 6 is a perspective view of the outer cylinder part 45 of the first nozzle 42.

The leading end portion of the outer cylinder part 45 is a substantially conical shape that narrows as approaching the leading end, and a plurality of grooves 46 slanted relative to the axial direction of the electrode 41 is formed in an outer circumference of the leading end portion of this outer cylinder part 45. These grooves 46 extend until the leading end of the outer cylinder part 45.

Referring back to FIG. 5, a second ejection hole 48 of annular shape is formed in the leading of the second nozzle 47, and shield gas ejects through this second ejection hole 48.

The second ejection hole 48 of the second nozzle 47 faces a direction away from the electrode 41. In addition, the second ejection hole 48 of the second nozzle 47 is positioned more to a base end side in an axial direction of the electrode 41 than the first ejection hole 43 of the first nozzle 42.

Furthermore, the aforementioned grooves 46 of the first nozzle 42 extend until the second ejection hole 48 of the second nozzle 47.

Next, plasma arc welding using the plasma arc welding device 2 will be explained while referencing FIGS. 7 to 10.

More specifically, the plasma arc welding device 2 forms a tailored blank material by but welding a workpiece W(1) that is a plate material having a thin thickness, and a workpiece W(2) that is a plate material having a thickness that is thicker than the workpiece W(1).

First, electric current is passed through the four electromagnets 21 to cause a magnetic field from the electromagnet (N) towards the electromagnet (S) at the front in the joining direction to generate, as well as a magnetic field from the electromagnet (N) towards the electromagnet (S) at the rear in the joining direction to generate. The direction of this magnetic field B (refer to FIG. 4) goes from left to right on the page in FIG. 9, and goes from in the page to out of the page orthogonally to the page in FIG. 10.

In addition, plasma gas is made to eject from the first ejection hole 43 of the first nozzle 42, while the arc A is generated by applying voltage between the electrode 41 and the workpieces W(1) and W(2). In addition, shield gas is made to eject from the second ejection hole 48 of the second nozzle 47 so as to surround the periphery of the arc A.

Figure 7:
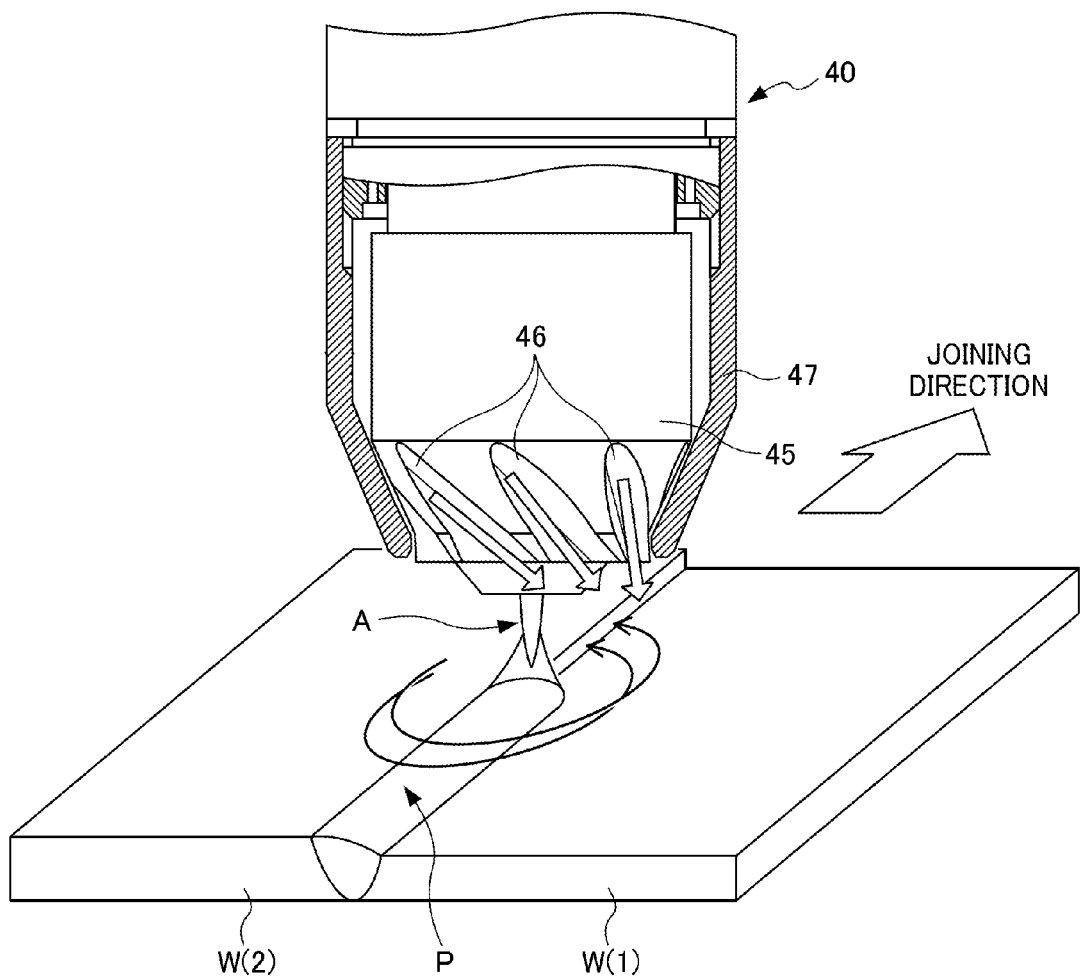
FIG. 7 is a perspective view illustrating operation of the plasma torch of the plasma arc welding device according to the second embodiment.

Then, the shield gas flows along the plurality of grooves 46 in the direction of the white arrows in FIG. 7, and ejects from the second ejection hole 48. This ejected shield gas flows in a spiral along the surface of the arc A, while spreading in a direction away from the arc A, and is blown against the surface of the molten pool P in a direction revolving about the arc A, i.e. direction of the black arrows in FIG. 7.

Figure 8:
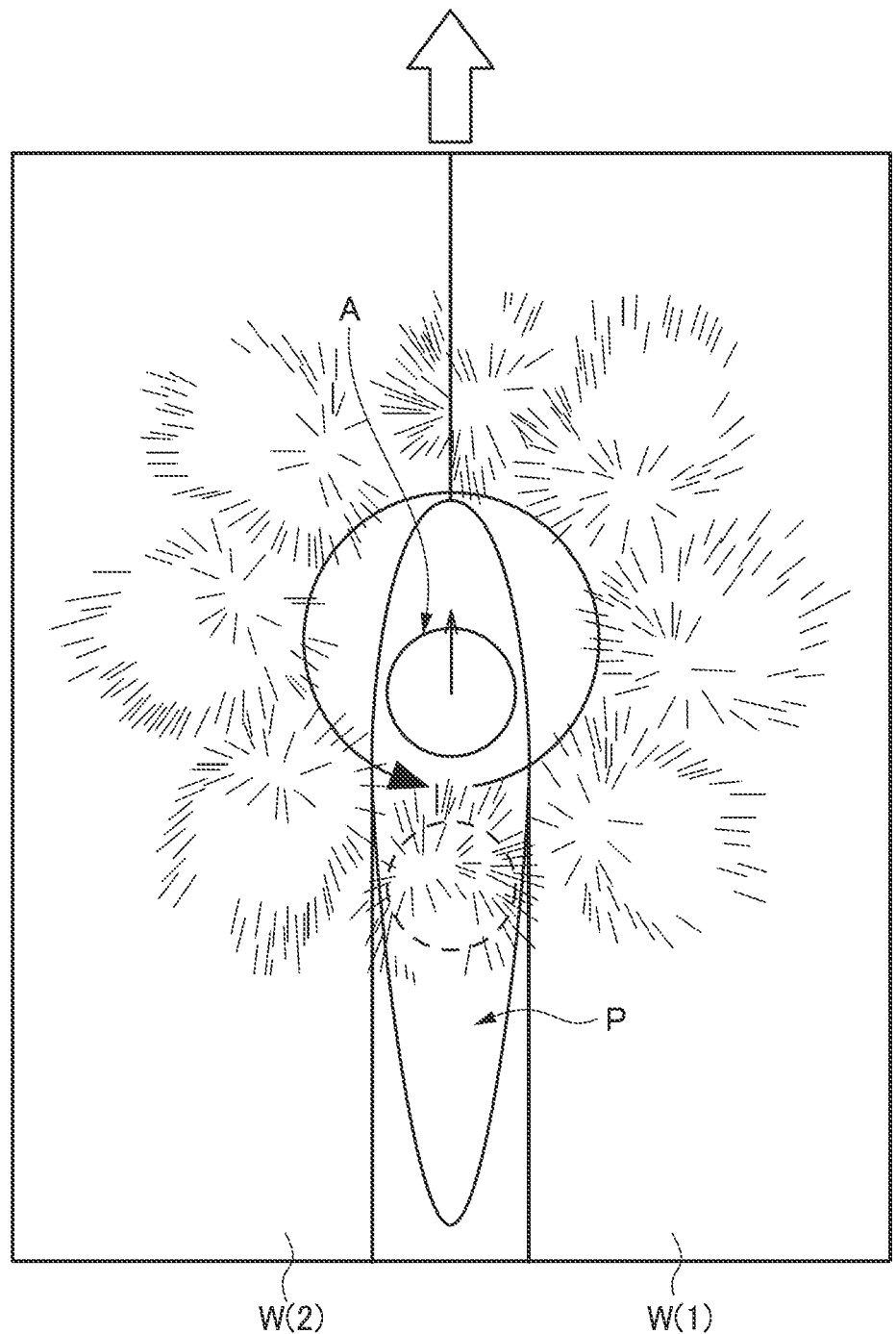
FIG. 8 is a plan view illustrating operation of the plasma torch of the plasma arc welding device according to the second embodiment.
Figure 9:
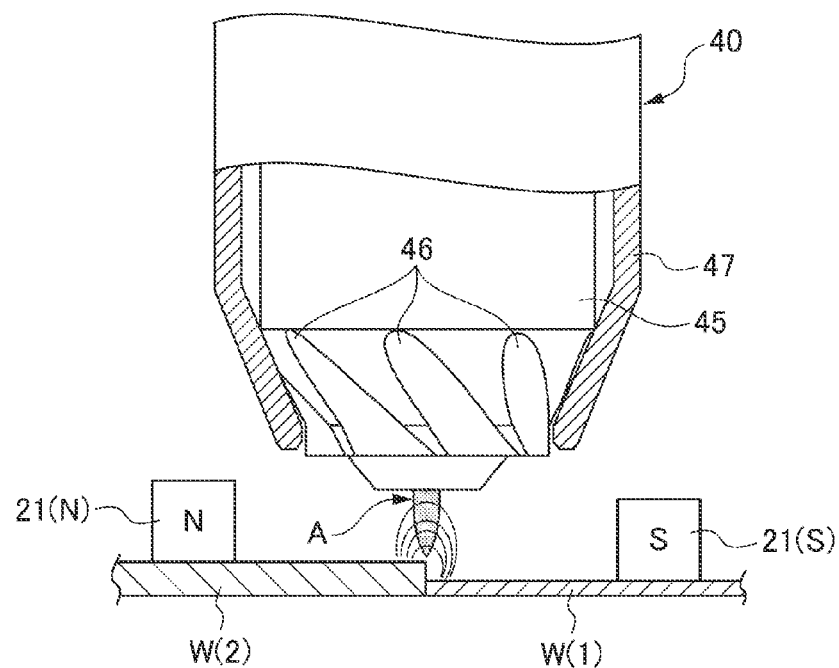
FIG. 9 is a front view schematically showing the plasma arc welding device according to the second embodiment.
Figure 10:
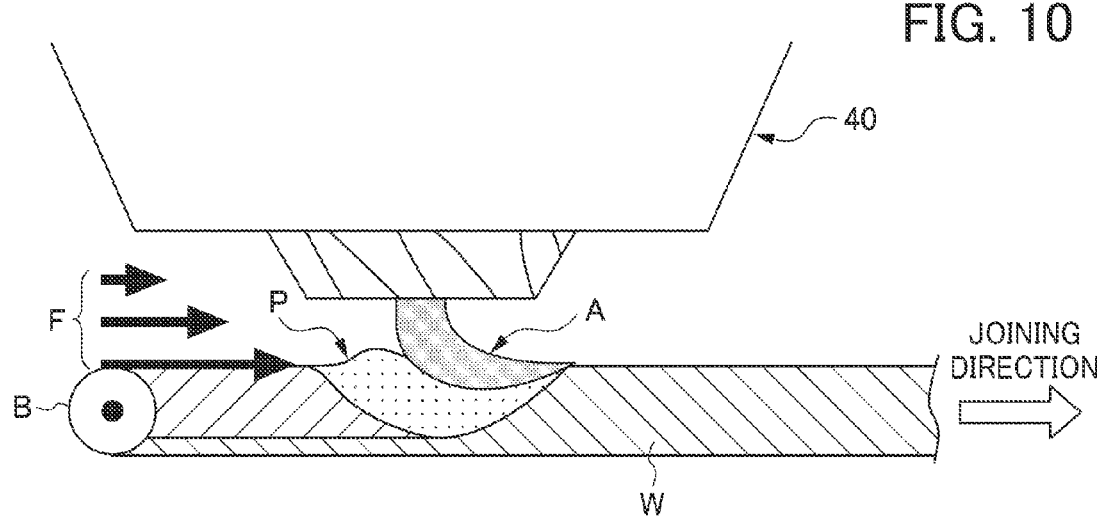
FIG. 10 is a right-side view of the plasma arc welding device shown in FIG. 9.

More specifically, as shown in FIG. 8, the shield gas is blown at eight locations on the workpieces W(1) and W(2), and the flow direction of the shield gas at each location comes to be as shown by the black arrow in FIG. 8.

In addition, the leading end side of the arc A is bent forwards in the direction of advancement of the plasma torch 40, by the Lorentz force F resulting from the direction of the current I flowing in the arc A (refer to FIG. 4) and the magnetic field B leaked from the butting portion of the workpiece W.

When the plasma torch 40, i.e. arc A, is made to move in the joining direction in this state, the molten pool P comes to extend to the front and back of the arc A in a plan view, as shown in FIG. 8. Therefore, the molten metal in a region surrounded by the dotted line in FIG. 8 at the rear side in the direction of advancement of the arc A moves by being pushed by the blown shield gas from the thick plate of the workpiece W(2) to the thin plate of the workpiece W(1). Favorable welding is thereby performed while a concaved portion of the welding base metal of the thin plate of the workpiece W(1) is filled by this molten metal thus moved.

In addition to the aforementioned effects of the first embodiment, there are the following effects according to the present embodiment.

(2-1) In a case of welding the workpieces W(1) and W(2) of different thickness, it is possible to make the molten metal at the rear side in the direction of movement of the arc A to move towards the thin plate of the workpiece W(1) by blowing the shield gas flowing in a spiral against the surface of the molten pool P. It is thereby possible to fill the concaved portion of the welding base metal of the thin plate of the workpiece W(1) by this molten metal thus moved. As a result thereof, it is possible to ensure the strength of the welded workpiece W, by suppressing the plate thickness of the thin plate of the workpiece W(1) from thinning by undercutting.

(2-2) Since the second ejection hole 48 of the second nozzle 47 is pointed in a direction away from the electrode 41, when causing the shield gas to eject from this second nozzle 47, the sprayed shield gas spreads in a direction away from the arc A. Therefore, since the shield gas does not directly strike the arc A, the arc A can be prevented from being disturbed, and welding becomes stable.

(2-3) Since the grooves 46 are extended until the second ejection hole 48 of the second nozzle 47, even if the flowrate of shield gas is reduced, it is possible to make the molten metal reliably move, while stabilizing the plasma gas.

(2-4) Since the second ejection hole 48 of the second nozzle 47 is positioned more to a base end side in the axial direction of the electrode 41 than the first ejection hole 43 of the first nozzle 42, it is possible to prevent the arc A from being disturbed, by protecting the shield gas from directly striking the arc A.

Third Embodiment

Figure 11:
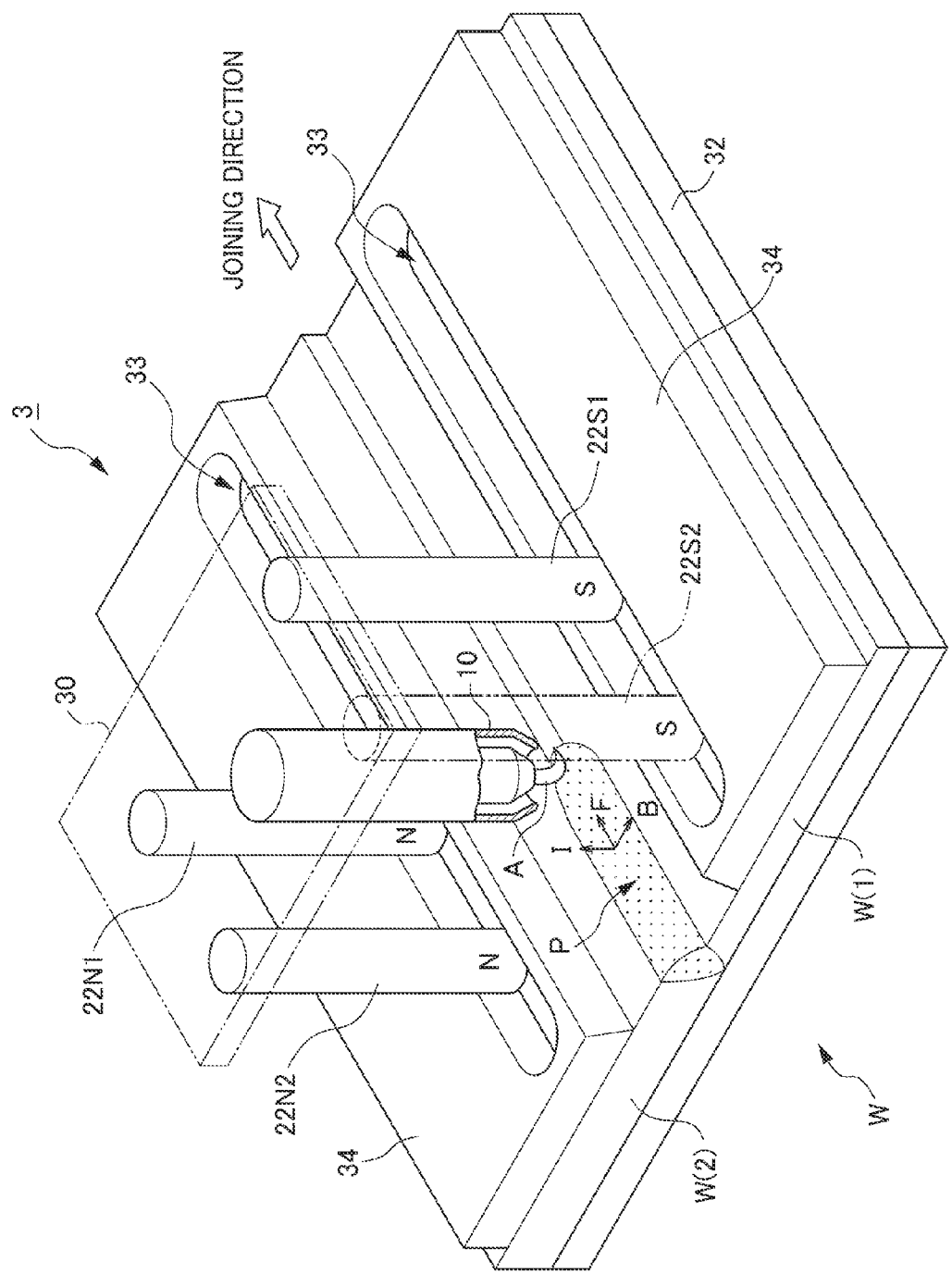
FIG. 11 is a perspective view of a plasma arc welding device according to a third embodiment.

FIG. 11 is a perspective view of a plasma arc welding device 3 serving as an arc welding device according to a third embodiment of the present invention.

The plasma arc welding device 3 includes a plasma torch 10 serving as an arc torch, four electromagnets 22N1, 22N2, 22S1 and 22S2 serving as a magnetic field generating mechanism, a support frame 30, a clamp 34, and a base 32.

In cases where it is not necessary to individually distinguish between the electromagnets 22N1 and 22N2, these will be collectively referred to as "electromagnets 22N". Similarly, in cases where it is not necessary to individually distinguish between the electromagnets 22S1 and 22S2, these will be collectively referred to as "electromagnets 22S". Furthermore, in cases where it is not necessary to individually distinguish between the electromagnets 22N1, 22N2, 22S1 and 22S2, these will be collectively referred to as "electromagnets 22".

Figure 12:
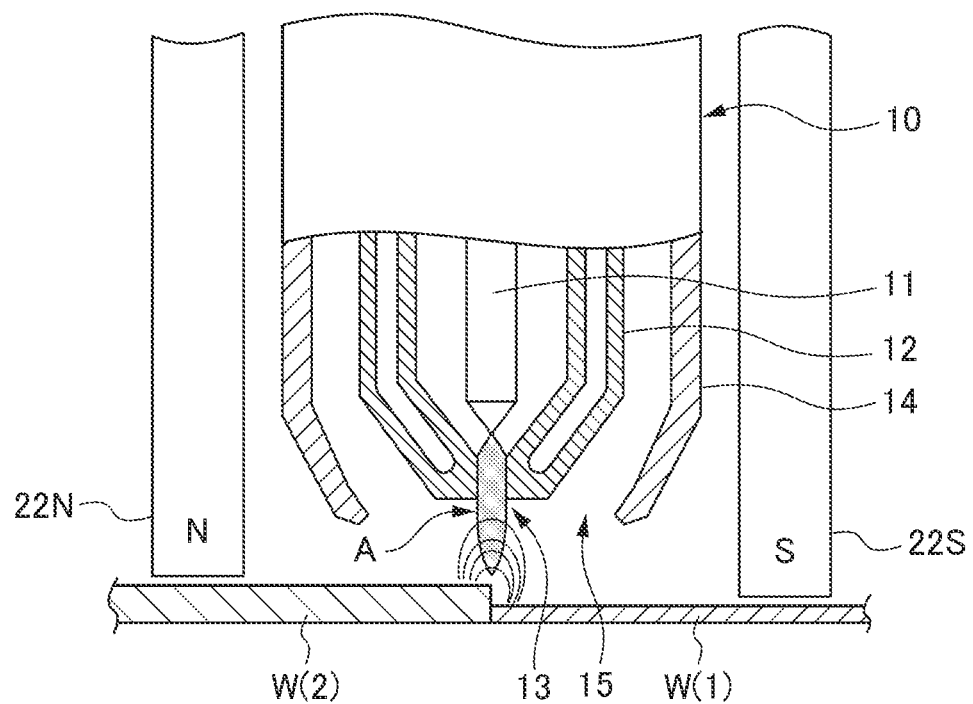
FIG. 12 is a front view schematically showing the plasma arc welding device shown in FIG. 11.

FIG. 12 is a front view schematically showing the plasma arc welding device 3. A right-side view of the plasma arc welding device 3 shown in FIG. 12 is the same as the right-side view of the plasma arc welding device 1 according to the first embodiment (FIG. 3).

The electromagnets 22N and 22S generate, inside of the workpiece W, a magnetic field B in a direction orthogonal to the direction of advancement of the plasma torch 10 (joining direction).

Then, the leading end side of the arc A is bent forwards in the direction of advancement of the arc A by the Lorentz force F generated by this magnetic field B and the current I flowing between the plasma torch 10 and workpiece W (refer to FIG. 3).

Referring back to FIG. 11, the four electromagnets 22 are each arranged at the front, back, left and right in a plan view, centered around the plasma torch 10 positioned above the welded part so as to surround this plasma torch 10.

In other words, the electromagnets 22N1 and 22N2 having a lower end that is the n-pole are respectively arranged in front and back in the joining direction on one side (left side in the present example) of the butting portion facing the direction of advancement of the plasma torch 10 (joining direction).

The electromagnets 22S1 and 22S2 having a lower end that is the s-pole are respectively arranged in front and back in the joining direction on the other side (right side in the present example) of the butting portion facing the direction of advancement of the plasma torch 10 (joining direction).

The electromagnet 22N and electromagnet 22S at the front in the joining direction are arranged to oppose each other in the plane orthogonal to the extending direction of the butting portion (joining line). As a result, the direction of the magnetic field B from the electromagnet 22N1 to the electromagnet 22S1 at the front in the joining direction is orthogonal to the extending direction of the butting portion (joining line).

Similarly, the electromagnet 22N2 and electromagnet 22S2 at the rear in the joining direction are arranged to oppose each other in a plane orthogonal to the extending direction of the butting portion (joining line). For this reason, the direction of the magnetic field B from the electromagnet 22N2 to the electromagnet 22S2 at the rear in the joining direction is orthogonal to the extending direction of the butting portion (joining line).

A pair of the clamps 34 includes penetrating grooves 33 running along the joining direction, respectively. The penetrating grooves 33 are formed in a width larger than the diameter of the columnar electromagnets 22N and 22S.

The support frame 30 supports the four electromagnets 22 and the plasma torch 10.

The pair of clamps 34 retain a upper surface of the workpieces W (workpiece W(1) and workpiece W(2)). The four electromagnets 22 are each supported through the penetrating grooves 33 to the support frame 30 so that a small gap is formed between the lower end face of these and the upper surface of the workpiece W.

The plasma torch 10 is supported to the support frame 30 so that the arc A extending from a lower end thereof is positioned at a predetermined height enabling welding of the butting portion of the workpieces W.

The base 32 retains the lower surface of the workpiece W. In other words, the base 32 functions as a jig fixing so as to sandwich the workpiece W with the clamps 34.

The distance between the four electromagnets 22 and the plasma torch 10, and the gap between the four electromagnets 22 and the workpieces W are respectively set so that a large leaked magnetic field generates at the surface of the butting portion by sufficiently magnetizing the workpiece W, while avoiding the magnetic field from acting on the base end side of the arc A and the arc A bending forwards in the direction of advancement from the base end.

It should be noted that the support frame 30 includes a first lift mechanism (not illustrated) that causes the plasma torch 10 to raise or lower, and a first movement mechanism (not illustrated) that causes the plasma torch 10 to move horizontally in the joining direction.

In addition, the support frame 30 includes a second lift mechanism (not illustrated) that causes the four electromagnets 22 to raise or lower, and a second movement mechanism (not illustrated) that causes the four electromagnets 22 to move horizontally in the joining direction. The four electromagnets 22 move along the penetrating grooves 33 by way of the second movement mechanism.

Furthermore, the support frame 30 also includes a clamp drive mechanism (not illustrated) that causes the clamp 34 to be arranged on the upper surface of the workpiece W.

Next, operation in a case of the plasma arc welding device 3 performing plasma arc welding will be explained while referencing FIGS. 12 and 3.

More specifically, operations of the plasma arc welding device 3 from butt welding a workpiece W(1) that is a plate material having a thin thickness and a workpiece W(2) that is a plate material having a thickness that is thicker than the workpiece W(1) until forming a tailored blank material will be explained.

First, in a state in which the lower surface of the workpiece W is retained on the base 32, the second movement mechanism and second lift mechanism arrange the four electromagnets 22 at positions corresponding to the weld starting end. At this time, the four electromagnets 22 are arranged through the penetrating grooves 33 to make so that a small gap is formed between the lower end surface of these and the upper surface of the workpiece W.

In this state, an electromagnet control unit (not illustrated) flows current so that the lower end becomes the n-pole in electromagnets 22N and so that the lower end becomes the s-pole in the electromagnets 22S, respectively. Then, the magnetic field B is generated from the electromagnets 22N to the electromagnets 22S.

In addition, the first movement mechanism and the first lift mechanism arrange the plasma torch 10 at a position a predetermined height above the weld starting end of the butting portion, and the clamp drive mechanism arranges the clamp 34 on the upper surface of the workpiece W. The workpiece W is thereby fixed by the clamp 34 and the base 32.

In this state, a gas ejecting part (not illustrated) ejects plasma gas from the first ejection hole 13 of the first nozzle 12, while a power source (not illustrated) causes the arc A to form by applying voltage between the electrode 11 and workpiece W. In addition, the gas ejecting part (not illustrated) causes shield gas to eject from the second ejection hole 15 of the second nozzle 14 so as to surround the periphery of the arc A.

Then, the leading end side of the arc A is bent forwards in the direction of advancement of the plasma torch 10, by way of the Lorentz force F (refer to FIG. 11) resulting from the direction of the current I flowing in the arc A (refer to FIG. 11) and the direction of the magnetic field B leaked from the butting portion of the workpiece W (refer to FIG. 11).

In this state, the plasma torch 10 is made to move horizontally in the joining direction by way of the first movement mechanism, and the four electromagnets 22 are made to move horizontally in the joining direction along the penetrating grooves 33 by way of the second movement mechanism. The molten pool P having a penetration depth that is thereby ensured is formed, whereby favorable welding is performed.

Next, in the plasma arc welding device 3 capable of executing the above operations, the materials of the clamp 34 and base 32 serving as a jig to fix the workpiece W will be explained.

(Case Using Magnetic Base and Magnetic Clamp)

First, a case of using a magnetic substance such as iron as the material of the clamp 34 and base 32 will be explained while referencing FIGS. 13 to 16.

Herein, knowledge of the Curie temperature becomes necessary as a prerequisite of the explanation of the material of the clamp 34 and base 32. Therefore, the Curie temperature will be explained hereinafter.

Generally, the atomic magnetic moment forms lines in the same direction at low temperature; however, when the temperature rises, the direction thereof starts to waver with the influence of thermal energy. For this reason, the overall magnetic moment (spontaneous magnetization) decreases little by little. When the temperature further rises, the reduction in spontaneous magnetization suddenly progresses, and the atomic magnetic moment tends to come to be in completely scattered directions at a certain temperature or higher, and spontaneous magnetization becomes 0. The temperature at which the spontaneous magnetism becomes 0 in this way is called the Curie temperature or Curie point.

In other words, even for an object becoming a magnetic substance at less than the Curie temperature, it will become a non-magnetic substance when reaching the Curie temperature or higher.

Therefore, in the case of the workpiece W being iron, the Curie temperature thereof is about 770° C., and the melting part in arc welding reaches a temperature exceeding the Curie temperature (about 770° C.), and thus becomes a non-magnetic substance.

Figure 13:
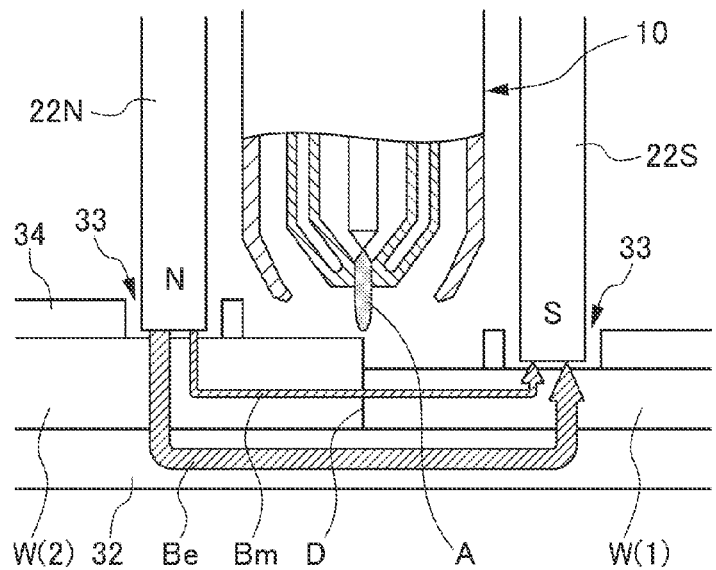
FIG. 13 is a front view schematically showing the plasma arc welding device according to the third embodiment in a case of using a magnetic jig.

FIG. 13 is a front view schematically showing the plasma arc welding device according to the third embodiment in a case of using a magnetic substance such as iron as the material of the clamp 34 and base 32.

As paths for magnetic flux from the electromagnets 22N to 22S (hereinafter referred to as "magnetic path"), a magnetic path through which a magnetic flux Bm passes in the workpiece W and a magnetic path through which a magnetic flux Be leaked from the workpiece W passes the clamp 34 and base 32 exist.

It should be noted that, although the leaked magnetic flux Be from the workpiece W is illustrated as though passing only though the base 32 in FIG. 13, this is for convenience of explanation, and may actually pass partially through the clamp 34 as well.

Herein, a butting portion D between the workpiece W(1) and workpiece W(2) exists in the magnetic path passing the workpiece W.

Figure 14A:
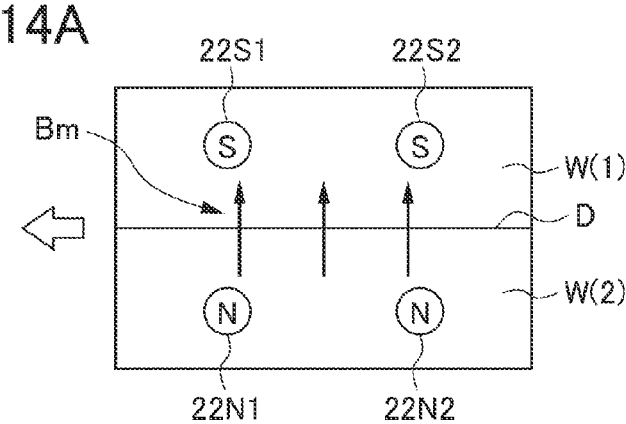
FIG. 14 is a diagram viewing a workpiece W in a plan view.
Figure 14B:
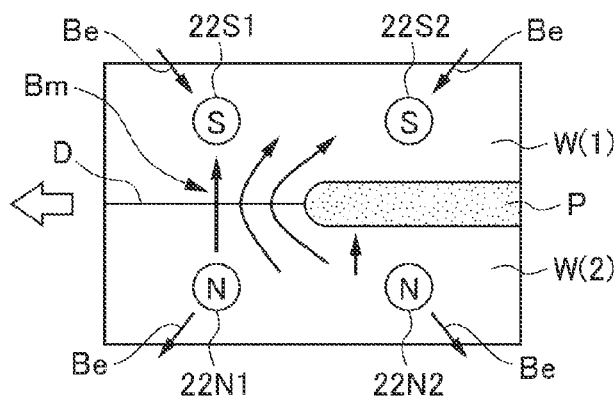

FIG. 14 is a diagram viewing the workpiece W in a plan view. More specifically, FIG. 14A is a diagram viewing the workpiece W prior to arc welding in a plan view, and FIG. 14B is a diagram viewing the workpiece W during arc welding in a plan view.

Prior to arc welding, since the workpiece W is at a temperature less than the Curie point at every location, the magnetic resistance in the magnetic path through which the magnetic flux Bm passes inside of the workpiece W is almost equal at every location. Therefore, as shown in FIG. 14A, the magnetic flux Bm becomes substantially the same magnetic flux density at every location in the workpiece W from the electromagnetic 22N to the electromagnetic 22S.

However, during arc welding, the welded part at which the arc weld is made in the butting portion D is the molten pool P exceeding the Curie point, and thus becomes non-magnetic and the magnetic resistance increases. Therefore, as shown in FIG. 14B, from the electromagnetic 22N to the electromagnet 22S, the magnetic flux Bm passes through a magnetic portion of forward in the direction of advancement of the plasma torch 10 (joining direction) when looking from the molten pool P (due to being less than the Curie point), without substantially passing through the molten pool P, which is a non-magnetic substance, or becomes the leaked magnetic flux Be and passes through the base 32 or clamp 34, which are magnetic substances.

As shown in FIG. 13, this leaked magnetic flux Be is large, a result of which the overall magnetic flux Bm declines; therefore, the Lorentz force F declines, and it is no longer possible to bend the arc A. This state is shown in FIGS. 15 and 16.

Figure 15:
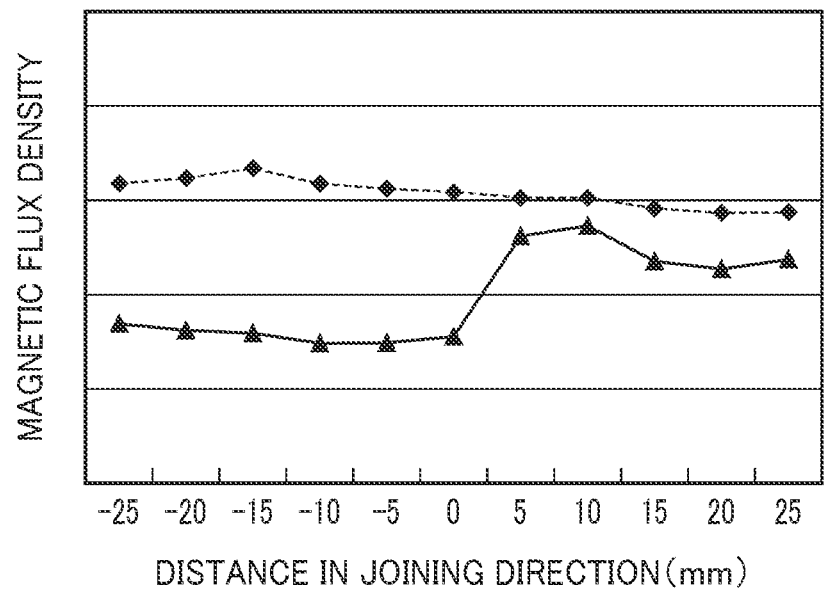
FIG. 15 is a graph showing a magnetic flux density penetrating the workpiece W before and after the plasma arc welding device according to the third embodiment performs arc welding thereon in a case of using a magnetic jig.
Figure 16:
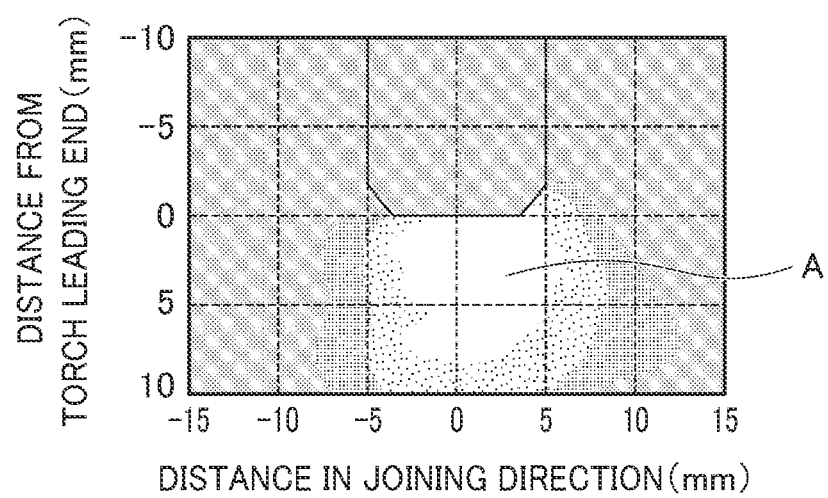
FIG. 16 is a graph showing the state of an arc when the plasma arc welding device according to the third embodiment performs arc welding in a case of using a magnetic jig.

FIG. 15 is a graph showing the magnetic flux density Bm passing though the workpiece W before and after the plasma arc welding device according to the third embodiment performs arc welding thereon in a case of using a magnetic substance such as iron as the material of the clamp 34 and base 32.

In FIG. 15, the horizontal axis indicates the distance (mm) from the plasma torch 10 in the joining direction (direction of advancement of the plasma torch 10). In other words, in the horizontal axis, 0 mm indicates the position of the plasma torch 10, the right side plus direction indicates the joining direction, and the left side minus direction indicates the opposite direction to the joining direction.

The vertical axis indicates the magnetic flux density at each position for the magnetic flux density Bm passing through the workpiece W.

In addition, the dotted line indicates the distribution of the magnetic flux density Bm of the workpiece W prior to arc welding, and the solid line indicates the distribution of the magnetic flux density Bm of the workpiece W during arc welding.

As shown by the dotted line in FIG. 15, it is found that the distribution of the magnetic flux density Bm of the workpiece W prior to arc welding is almost uniform. Herein, the magnetic flux density Bm of the workpiece W prior to arc welding is defined as the magnetic flux necessary in order to cause a Lorentz force F bending the arc A forwards to be generated. In other words, herein, a state in which the magnetic flux necessary in order to produce the Lorentz force F to bend the arc A forward is being generated is defined as an initial state. It should be noted that the magnitude of the excitation current of the four respective electromagnets 22 in this case was about 30 A.

Thereafter, when arc welding is performed while keeping the magnitude of the excitation current of the four respective electromagnets 22 at about 30 A, the magnetic flux density Bm of the workpiece W becomes as shown by the solid line in FIG. 15.

In other words, as shown by the solid line in FIG. 15, a portion of the workpiece W at positions −25 mm to 0 mm behind the plasma torch 10 corresponds to the molten pool P of FIG. 14, and it is found that, due to exceeding the Curie point and becoming a non-magnetic substance, it becomes a magnetic flux density lower than the initial state (dotted line).

On the other hand, as shown by the solid line in FIG. 15, although the portion of the workpiece W at 0 mm to 25 mm ahead of the plasma torch 10 is under heating by the arc A, since it is a magnetic substance at less than the Curie point, the magnetic flux increases more than the part of the non-magnetic substance at −25 mm to 0 mm behind, and thus lowers somewhat more than the initial state.

However, although it is easily found when comparing between the dotted line and solid line in FIG. 15, since the leaked magnetic flux Be passes through the magnetic clamp 34 and base 32, the magnetic flux Bm decreases by this amount.

For this reason, sufficient Lorentz force F is not produced, and the arc A is not sufficiently bent to the joining direction (direction of advancement of the plasma torch 10), as shown in FIG. 16.

FIG. 16 is a graph showing the state of the arc A when the plasma arc welding device according to the third embodiment performs arc welding in a case of using a magnetic substance such as iron as the material of the clamp 34 and base 32.

The horizontal axis in FIG. 16 is the same as the horizontal axis in FIG. 15, i.e. indicates the distance (mm) from the plasma torch 10 in the joining direction (direction of advancement of the plasma torch 10).

The vertical axis indicates the distance (mm) from the leading end of the plasma torch 10. In other words, on the vertical axis, 0 mm indicates the position of the leading end of the plasma torch 10, the downside plus direction indicates downwards toward the workpiece W, and the upside minus direction indicates upwards.

As shown in FIG. 16, it is found that the arc A does not sufficiently bend in the joining direction (direction of advancement of the plasma torch 10).

In the case of using a magnetic substance such as iron as the material of the clamp 34 and base 32 in this way, a great amount of leaked magnetic flux Be is produced, and the overall magnetic flux Bm passing through the workpiece W declines.

For this reason, the following three problems arise in the case of using a magnetic substance such as iron as the material of the clamp 34 and base 32.

The first problem is a problem in that, considering the leaked magnetic flux Be, the excitation current of the electromagnets 22 must be increased (must be set to at least 30 A in the present example) in order to produce a Lorentz force F of the magnitude for bending the arc A in the joining direction (direction of advancement of the plasma torch 10).

The second problem is a problem in that it is difficult to control the magnetic flux Bm in the workpiece W in front of the arc A, considering the leaked magnetic flux Be.

The third problem is a problem in that it becomes more difficult to control the magnetic flux Bm in the workpiece W due to magnetization accompanying the continued use of the clamp 34 and base 32.

(Case Using Non-magnetic Base and Non-magnetic Clamp)

The present inventors have obtained the knowledge that it is suitable to establish the raw materials of the clamp 34 and base 32 as non-magnetic substances such as of stainless steel, in the case of wanting to solve at least one of the above-mentioned first to third problems.

Therefore, the case of using a non-magnetic substance such as stainless steel as the material of the clamp 34 and base 32 will be explained hereinafter while referencing FIGS. 17 to 19.

Figure 17:
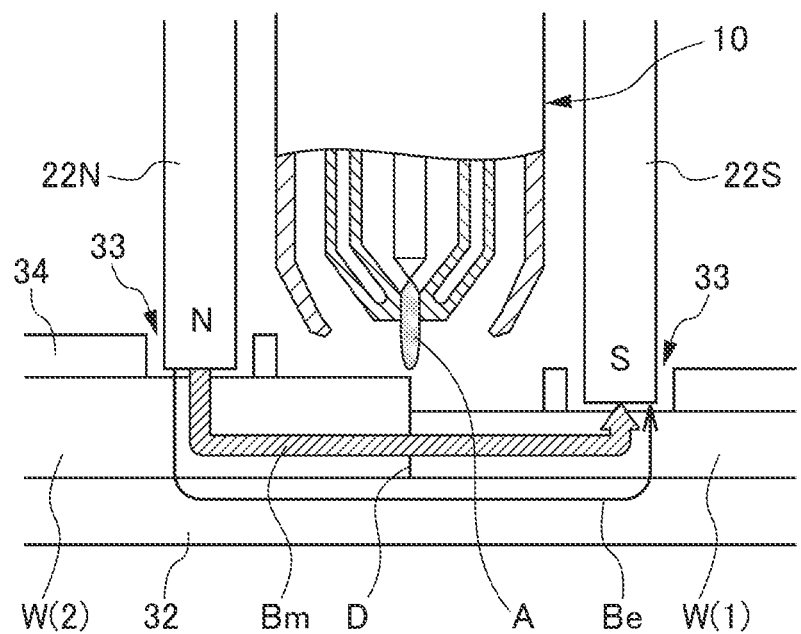
FIG. 17 is a front view schematically showing the plasma arc welding device according to the third embodiment in a case of using a non-magnetic jig.

FIG. 17 is a front view schematically showing the plasma arc welding device according to the third embodiment in a case of using a non-magnetic substance such as stainless as the material of the clamp 34 and base 32.

As magnetic paths from the electromagnets 22N to 22S, a magnetic path through which a magnetic flux Bm passes in the workpiece W and a magnetic path through which a magnetic flux Be leaked from the workpiece W passes the clamp 34 and base 32 exist.

However, as is easily found by comparing between FIGS. 13 and 17, the leaked magnetic flux Be passing though the clamp 34 and base 32 becomes overwhelmingly smaller in the case of being a non-magnetic substance (case of FIG. 17), compared to the case of being a magnetic substance (case of FIG. 13).

As a result thereof, the overall magnetic flux Bm passing through the workpiece W does not decline. However, as described above while referencing FIG. 14, the magnetic flux Bm does not easily pass through the molten pool P exceeding the Curie point, and thus converges to increase in front thereof (in front of the arc A). Herewith, a Lorentz force F of sufficient magnitude is produced, and makes so that the arc A sufficiently bends in the joining direction (direction of advancement of the plasma torch 10). This state is shown in FIGS. 18 and 19.

Figure 18:
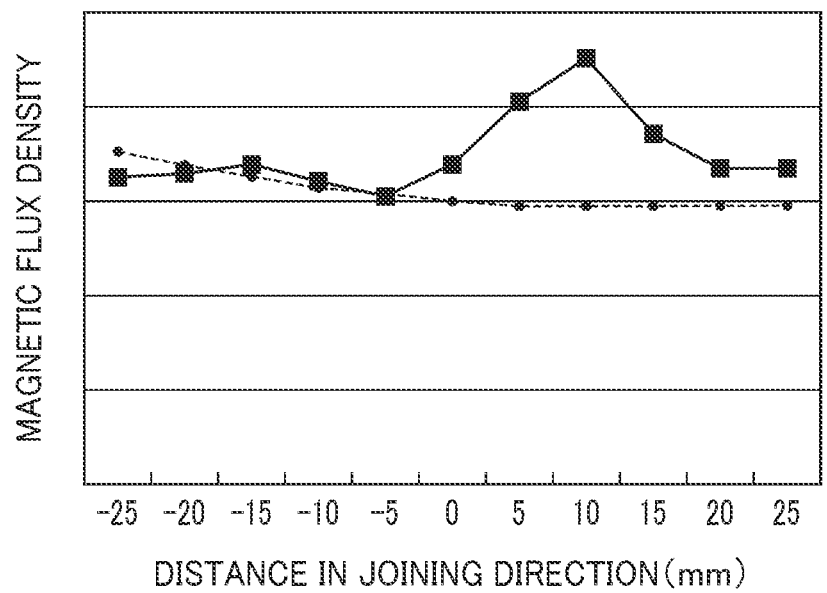
FIG. 18 is a graph showing the magnetic flux density passing through a workpiece before and after the plasma arc welding device according to the third embodiment performs arc welding thereon in a case of using a non-magnetic jig.

FIG. 18 shows the magnetic flux density Bm passing though the workpiece W before and after the plasma arc welding device according to the third embodiment performs arc welding thereon in a case of using a non-magnetic substance such as stainless steel as the material of the clamp 34 and base 32.

In FIG. 18, the horizontal axis is the same as the horizontal axis in FIG. 15, i.e. indicates the distance (mm) from the plasma torch 10 in the joining direction (direction of advancement of the plasma torch 10). The vertical axis is also the same as the vertical axis in FIG. 15, i.e. indicates magnetic flux density at each position for the magnetic flux density Bm passing through the workpiece W.

In addition, the dotted line indicates the distribution of the magnetic flux density Bm of the workpiece W prior to arc welding, and the solid line indicates the distribution of the magnetic flux density Bm of the workpiece W during arc welding.

As shown by the dotted line in FIG. 18, it is found that the distribution of the magnetic flux density Bm of the workpiece W prior to arc welding is almost uniform.

However, a notable point herein is the excitation current of the electromagnets 22 necessary in order to make the magnetic flux at each position on the workpiece W prior to arc welding substantially the same as the initial state of FIG. 15 (dotted line). In other words, the point that is noteworthy is that, whereas 30 A was also necessary in the case of using a magnetic substance as the material of the clamp 34 and base 32 (case of FIG. 15), it is done with 5 A in the case of using a non-magnetic substance as the material of the clamp 34 and base 32 (case of FIG. 18).

Thereafter, when arc welding is performed while keeping the magnitude of the excitation current of the four respective electromagnets 22 at about 5 A, the magnetic flux density Bm of the workpiece W becomes as shown by the solid line in FIG. 18.

In other words, as shown by the solid line in FIG. 18, a portion of the workpiece W at 0 mm to 25 mm ahead of the plasma torch 10 is under heating by the arc A; however, due to being a magnetic substance at less than the Curie point, the magnetic flux becomes higher than a part of the non-magnetic substance at −25 mm to 0 mm behind, and thus it becomes far higher than initial state (dotted line). In other words, comparing with about 5.5 mT (solid line in FIG. 15) for the case of using a magnetic substance as the material of the clamp 34 and base 32 (case of FIG. 15), it becomes far higher than this in the case of using a non-magnetic substance as the material of the clamp 34 an base 32 (case of FIG. 18).

For this reason, sufficient Lorentz force F is produced, and makes so that the arc A sufficiently bends in the joining direction (direction of advancement of the plasma torch 10).

Figure 19:
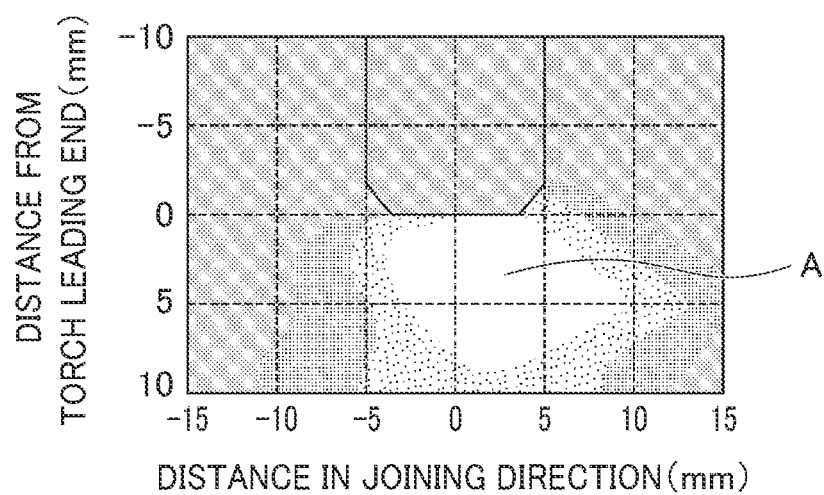
FIG. 19 is a graph showing the state of an arc when the plasma arc welding device according to the third embodiment performs arc welding in a case of using a non-magnetic material jig.

FIG. 19 is a graph showing the state of the arc A when the plasma arc welding device according to the third embodiment performs arc welding in a case of using a non-magnetic substance such as stainless steel as the material of the clamp 34 and base 32.

The horizontal axis in FIG. 19 is the same as the horizontal axis in FIG. 16, i.e. indicates the distance (mm) from the plasma torch 10 in the joining direction (direction of advancement of the plasma torch 10). The vertical axis in FIG. 19 is also the same as the vertical axis in FIG. 16, i.e. indicates the distance (mm) from the leading end of the plasma torch 10.

Upon comparing FIGS. 16 and 19, it is found that the arc A bends far more in the joining direction (direction of advancement of the plasma torch 10) in the case of using a non-magnetic substance as the material of the clamp 34 and base 32 (case of FIG. 19) than the case of using a magnetic substance as the material of the clamp 34 and base 32 (case of FIG. 16).

In this way, in the case of using a non-magnetic substance such as stainless steel as the material of the clamp 34 and base 32, the leaked magnetic flux Be comes to almost not occur; therefore, it is possible to maintain high overall magnetic flux Bm passing through the workpiece W even while keeping the excitation current of the electromagnets 22 low.

For this reason, it becomes possible to solve all of the aforementioned first to third problems arising in the case of using a magnetic substance such as iron as the material of the clamp 34 and base 32.

In other words, according to the plasma arc welding device 3 of the present embodiment using a non-magnetic substance such as stainless steel as the material of the clamp 34 and base 32, it becomes possible to exert the effects shown in the following (3-1) to (3-4) in addition to the aforementioned effects of the first embodiment.

(3-1) It is possible to decrease the leaked magnetic flux Be by employing the non-magnetic clamp 34 and base 32, compared to a case of employing magnetic ones; therefore, it is possible to increase the magnetic flux density Bm flowing through the workpiece W while keeping the excitation current to the electromagnets 22 low.

(3-2) It is possible to decrease the leaked magnetic flux Be by employing the non-magnetic clamp 34 and base 32, compared to a case of employing magnetic ones; therefore, control of the magnetic flux Bm is facilitated since the degree of concentration of the magnetic flux Bm forwards in the joining direction (direction of advancement of the plasma torch 10) when viewing from the plasma torch 10 rises.

(3-3) The clamp 34 and base 32 are not magnetized due to employing the non-magnetic clamp 34 and base 32; therefore, management of the clamp 34 and base 32 is facilitated, as well as control of the magnetic flux Bm being further facilitated.

(3-4) Since the welded part of the workpiece is processed at a temperature exceeding the Curie point, the welded portion becomes non-magnetic and it becomes difficult for magnetic flux to pass. The magnetic flux of the magnetic field generated by the magnetic field generating mechanism goes around to a portion ahead of the welded part, which is also a magnetic substance due to not having reached the Curie point, and the magnetic flux collects in a portion thereof; therefore, the magnetic flux of the magnetic field generated by the magnetic field generating mechanism may be even lower.

Fourth Embodiment

Figure 20:
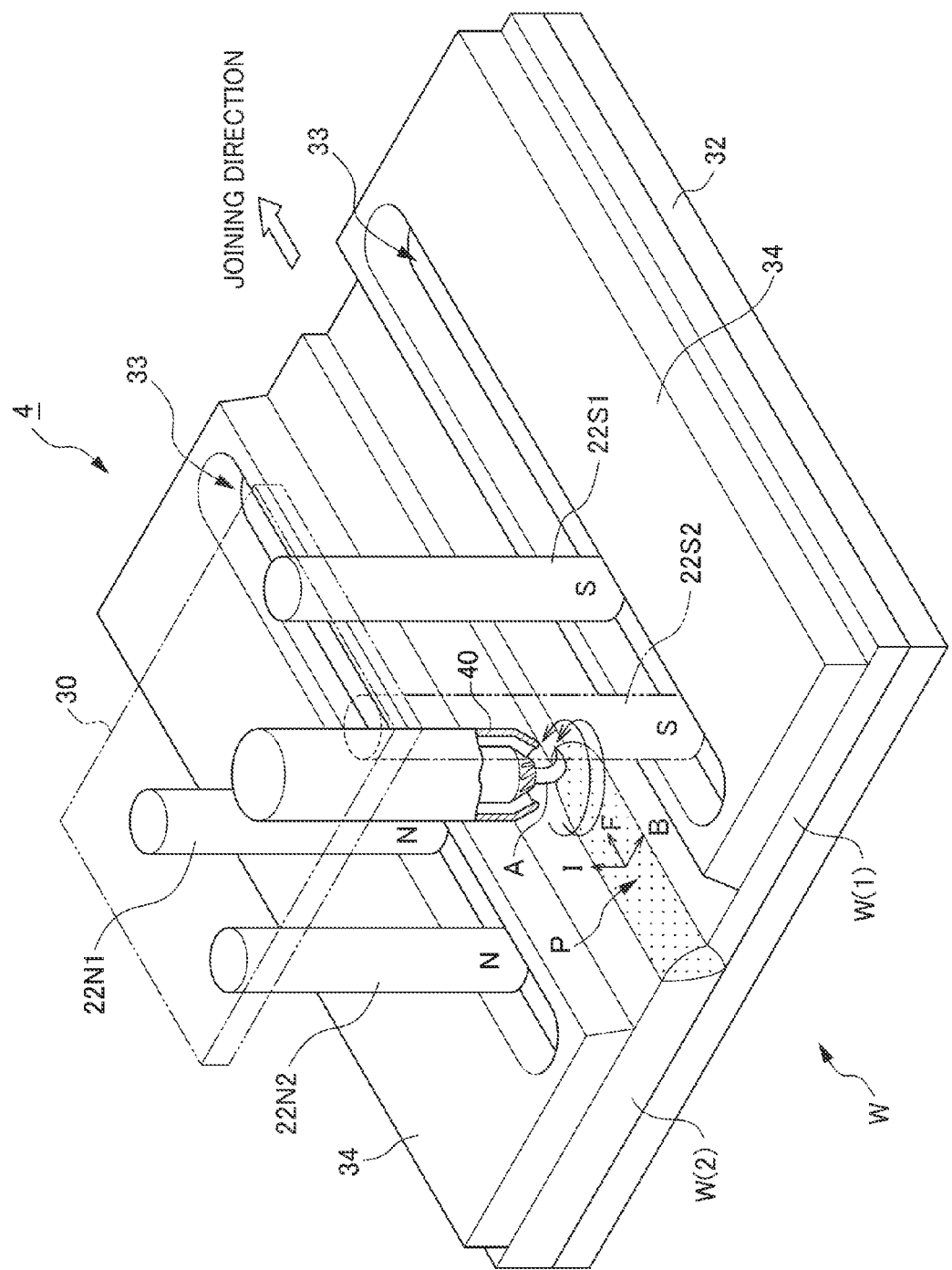
FIG. 20 is a perspective view of a plasma arc welding device according to a fourth embodiment.
Figure 21:
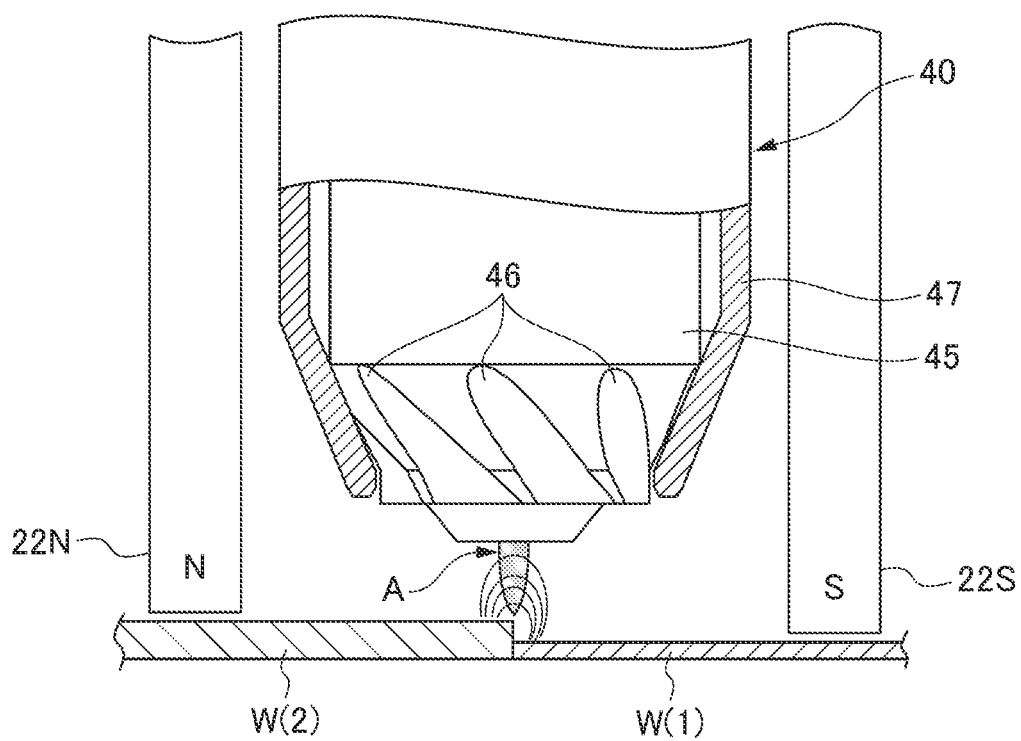
FIG. 21 is a front view schematically showing the plasma arc welding device according to the fourth embodiment.

FIG. 20 is a perspective view of a plasma arc welding device 4 serving as an arc welding device according to a fourth embodiment of the present invention.

The plasma arc welding device 4 includes a plasma torch 40 serving as an arc torch, four electromagnets 22N1, 22N2, 22S1 and 22S2 serving as a magnetic field generating mechanism, a clamp 34, a base 32, and a support frame 30.

In cases where it is not necessary to individually distinguish between the electromagnets 22N1 and 22N2, these will be collectively referred to as "electromagnets 22N". Similarly, in cases where it is not necessary to individually distinguish between the electromagnets 22S1 and 22S2, these will be collectively referred to as "electromagnets 22S". Furthermore, collectively referring to as "electromagnets 22" in cases where it is not necessary to individually distinguish between the electromagnets 22N1, 22N2, 22S1 and 22S2 is similar to the third embodiment.

Since the configuration of the plasma torch 40 of the present embodiment is identical to the plasma torch 40 of the second embodiment, plasma arc welding using the plasma arc welding device 4 will be explained while referencing FIGS. 7, 8, 21 and 10.

First, electric current is passed through the four electromagnets 22N1, 22N2, 22S1 and 22S2 shown in FIG. 20 to cause a magnetic field from the electromagnet 22N1 towards the electromagnet 22S1 at the front in the joining direction to generate, as well as a magnetic field from the electromagnet 22N2 towards the electromagnet 22S2 at the back in the joining direction to generate. The direction of this magnetic field B (refer to FIG. 20) is as described above in the aspect of going from left to right on the page in FIG. 21, and going from in the page to out of the page orthogonally to the page in FIG. 3.

In addition, plasma gas is made to eject from the first ejection hole 43 of the first nozzle 42, while the arc A is generated by applying voltage between the electrode 41 and the workpieces W(1) and W(2). In addition, shield gas is made to eject from the second ejection hole 48 of the second nozzle 47 so as to surround the periphery of the arc A.

Then, the shield gas flows along the plurality of grooves 46 in the direction of the white arrows in FIG. 7, and ejects from the second ejection hole 48. This ejected shield gas flows in a spiral along the surface of the arc A, while spreading in a direction away from the arc A, and is blown against the surface of the molten pool P in a direction revolving about the arc A, i.e. direction of black arrows in FIG. 7.

More specifically, as shown in FIG. 8, the shield gas is blown against the eight locations on the workpieces W(1) and W(2), and the flow direction of the shield gas at each location becomes as shown by the black arrow in FIG. 8.

When the plasma torch 40, i.e. arc A, is made to move in the joining direction in this state, the molten pool P comes to extend to the front and back of the arc A in a plan view. Therefore, the molten metal in a region surrounded by the dotted line in FIG. 8 at the rear side in the direction of advancement of the arc A moves by being pushed by the blown shield gas to the thinner workpiece W(1). Then, a concaved portion of the welding base metal of the thinner workpiece W(1) is filled by this molten metal thus moved.

There are similar effects to the aforementioned effects of the first embodiment to third embodiment according to the present embodiment.

Fifth Embodiment

Figure 22:
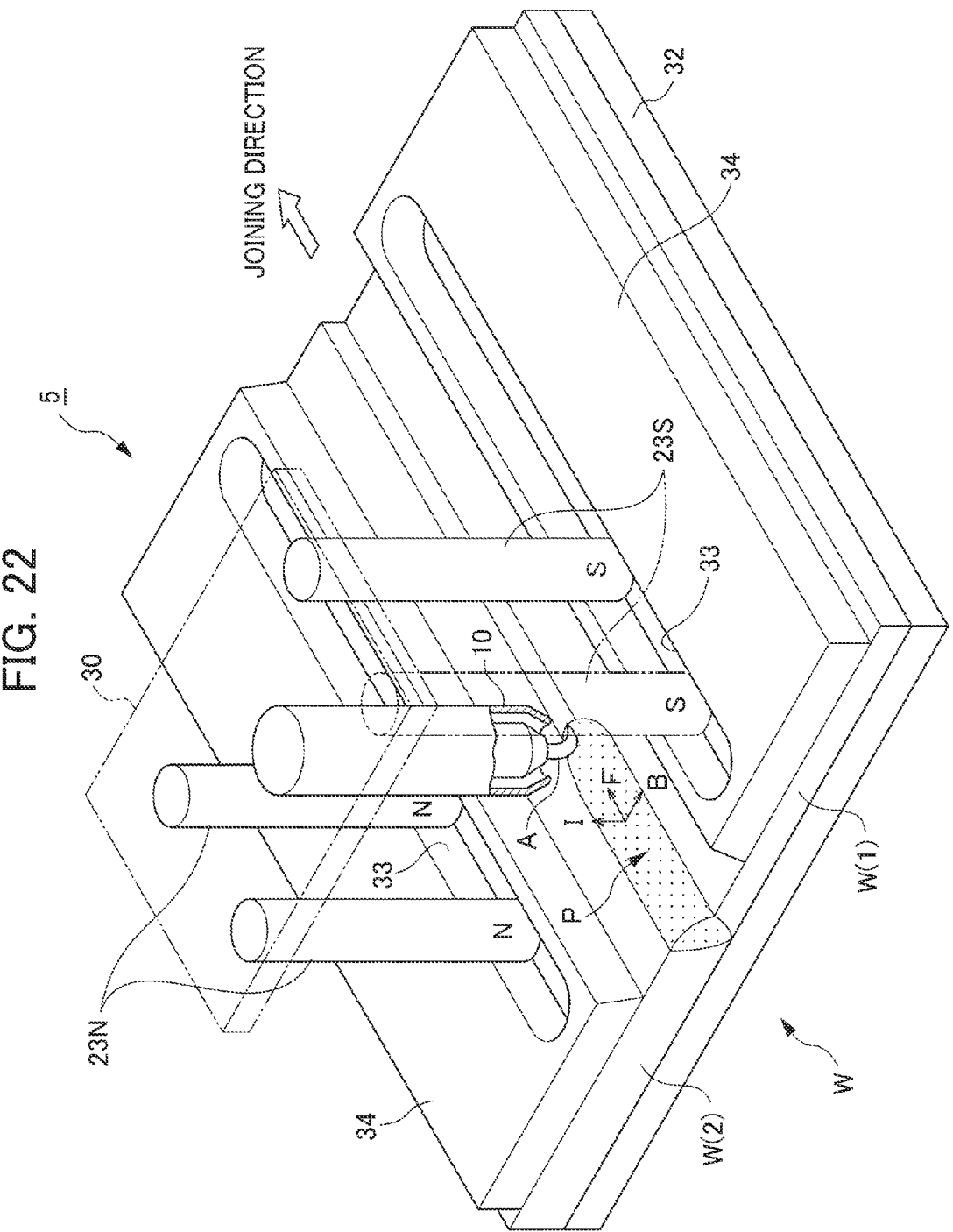
FIG. 22 is a perspective view of a plasma arc welding device according to a fifth embodiment.

FIG. 22 is a perspective view of a plasma arc welding device 5 according to a fifth embodiment adopting a magnetic field strength adjustment method of the present invention.

The plasma arc welding device 5 forms a tailored blank material, by butt welding a workpiece W. FIG. 22 shows butt welding between a workpiece W(1) having a plate thickness that is relatively thin, and a workpiece W(2) having a plate thickness that is thicker than the workpiece W(1).

As shown in FIG. 22, the plasma arc welding device 5 includes a plasma torch 10 serving as an arc torch, permanent magnets 23S and 23N serving as a magnetic field generating mechanism that generates a magnetic field, a support frame 30, a clamp 34 and a base 32. It should be noted that the permanent magnets 23S and 23N will collectively be referred to as permanent magnets 23.

The permanent magnets 23S and 23N generate a magnetic field B inside of the workpiece W that bends the leading end side of the arc A forwards in the direction of advancement of the plasma torch 10.

The magnetic field B generating by the permanent magnets 23S and 23N inside of the workpiece W is a magnetic field of a direction orthogonal to the direction of advancement of the plasma torch 10 (joining direction). The leading end side of the arc A is bent forwards in the direction of advancement of the plasma torch 10 by the Lorentz force F resulting from the magnetic field B and the current I flowing between the plasma torch 10 and workpiece W.

In a plan view, the permanent magnets 23S and 23N are arranged in front, back and left and right centering around the plasma torch 10 positioned above the welded part so as to surround the plasma torch 10.

In other words, on one side (e.g., left side) of the butting portion facing forwards in the direction of advancement of the plasma torch 10 (joining direction), two n-pole permanent magnets 23N are arranged in front and back in the joining direction.

On the other side (e.g., right side) of the butting portion facing the direction of advancement of the plasma torch 10 (joining direction), two s-pole permanent magnets 23S are arranged in front and back in the joining direction.

The permanent magnet 23N and permanent magnet 23S at the front in the joining direction are arranged to oppose each other in a plane orthogonal to the extending direction of the butting portion (joining line). For this reason, the direction of the magnetic field B from the permanent magnet 23N towards the permanent magnet 23S at the front in the joining direction is orthogonal to the extending direction of the butting portion (joining line).

Similarly, the permanent magnet 23N and permanent magnet 23S at the rear in the joining direction are arranged to oppose each other in a plane orthogonal to the extending direction of the butting portion (joining line). For this reason, the direction of the magnetic field B from the permanent magnet 23N toward the permanent magnet 23S at the rear in the joining direction is orthogonal to the extending direction of the butting portion (joining line).

The support frame 30 includes a pair of clamps 34 that retains an upper surface of the workpiece W. The pair of the clamps 34 includes penetrating grooves 33 running along the joining direction, respectively. The penetrating grooves 33 are formed in a width larger than the diameter of the columnar permanent magnets 23S and 23N.

The support frame 30 supports the permanent magnets 23S and 23N, and the plasma torch 10 positioned at the center of these.

The plasma torch 10 is supported to the support frame 30 so that the arc A extending from a lower end thereof is positioned at a predetermined height enabling welding of the butting portion of the workpiece W.

The permanent magnets 23S and 23N are each supported through the penetrating grooves 33 to the support frame 30 so that a small gap is formed between the lower end face of these and the upper surface of the workpiece W.

The distance between the permanent magnets 23S and 23N and the plasma torch 10, and the gap between the permanent magnets 23S and 23N and the workpieces W are respectively set so that a large leaked magnetic field generates at the surface of the butting portion by sufficiently magnetizing the workpiece W, while avoiding the magnetic field B acting on the base end side of the arc A and the arc A bending forwards in the direction of advancement from the base end.

It should be noted that the support frame 30 includes a first lift mechanism (not illustrated) that causes the plasma torch 10 to raise or lower, and a first movement mechanism (not illustrated) that causes the plasma torch 10 to move horizontally.

In addition, the support frame 30 includes a second lift mechanism (not illustrated) that causes the permanent magnets 23S and 23N to raise or lower, and a second movement mechanism (not illustrated) that causes the permanent magnets 23S and 23N to move horizontally.

Herein, a method of adjusting the magnetic field strength at the welded part in plasma arc welding by the plasma arc welding device 5 will be explained while referencing FIGS. 23 to 25. It should be noted that, in the present specification, magnetic field strength at the welded part indicates the magnetic field strength at a portion opposing the arc A just below the plasma torch 10.

Figure 23:
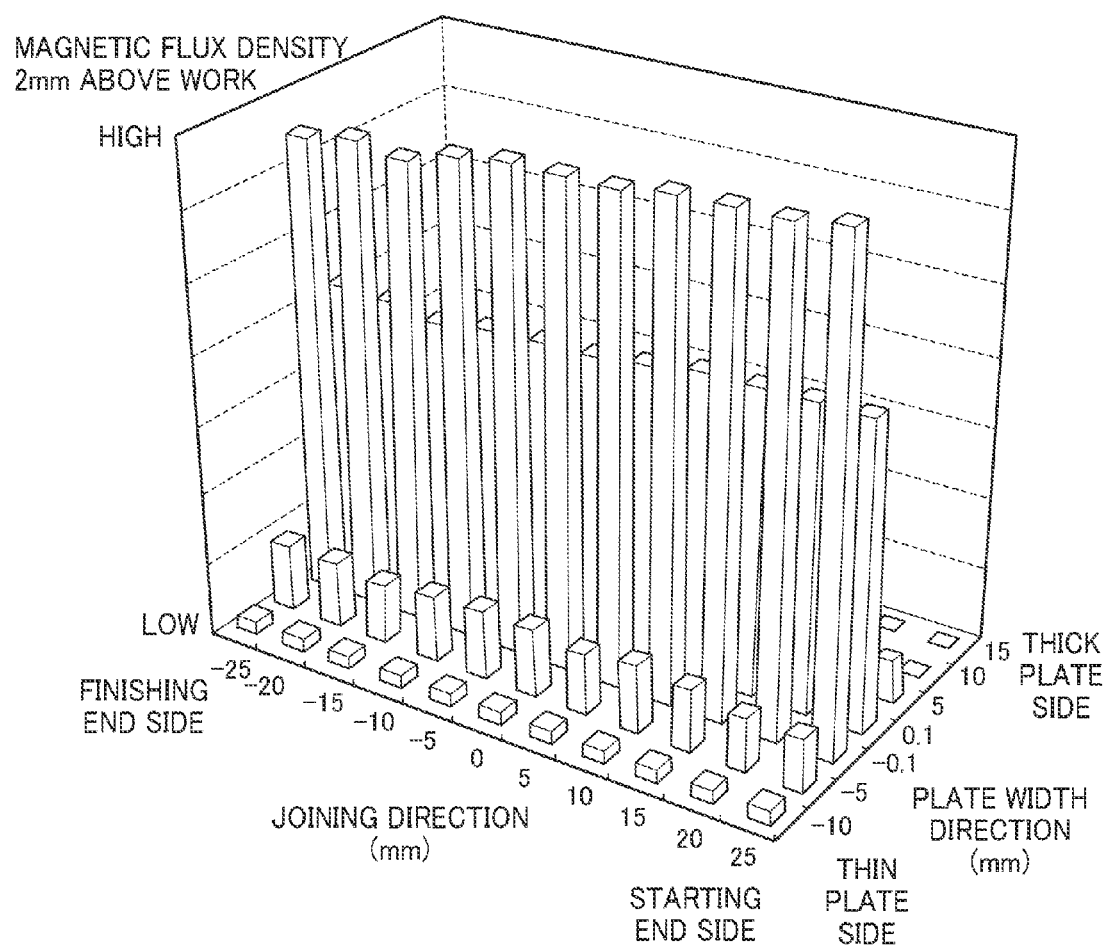
FIG. 23 is a graph showing the magnetic flux density in a plate width direction and a joining direction of a workpiece in which a thick plate and thin plate are butted together.

FIG. 23 is a graph showing the magnetic flux density in a plate width direction orthogonal to the joining direction and the joining direction (magnetic flux density at a position a height 2 mm from the upper surface of the workpiece) of the workpiece W in which the workpiece W(1) that is a thin plate and the workpiece W(2) that is a thick plate are butted together, when causing the magnetic field B in a direction orthogonal to the joining direction to be generated inside of the workpiece W.

It should be noted that FIG. 23 defines the butting portion as a reference point (0) in the plate width direction, expressing the distance from the reference point on a thick plate side as plus, and expressing the distance from the reference point on the thin plate side as minus. In addition, the central part in the joining direction is defined as the reference point (0) in the joining direction, the distance from the reference point in a starting end side is expressed as plus, and the distance from the reference point in the finishing end side is expressed as minus.

As shown in FIG. 23, in the plate width direction, the butting portion has the highest magnetic flux density, and the magnetic flux density declines with increasing distance from the butting portion. This is because a large leaked magnetic field is produced from the butting surface on the thick plate side. In contrast, the magnetic flux density is substantially constant in the joining direction.

Figure 24:
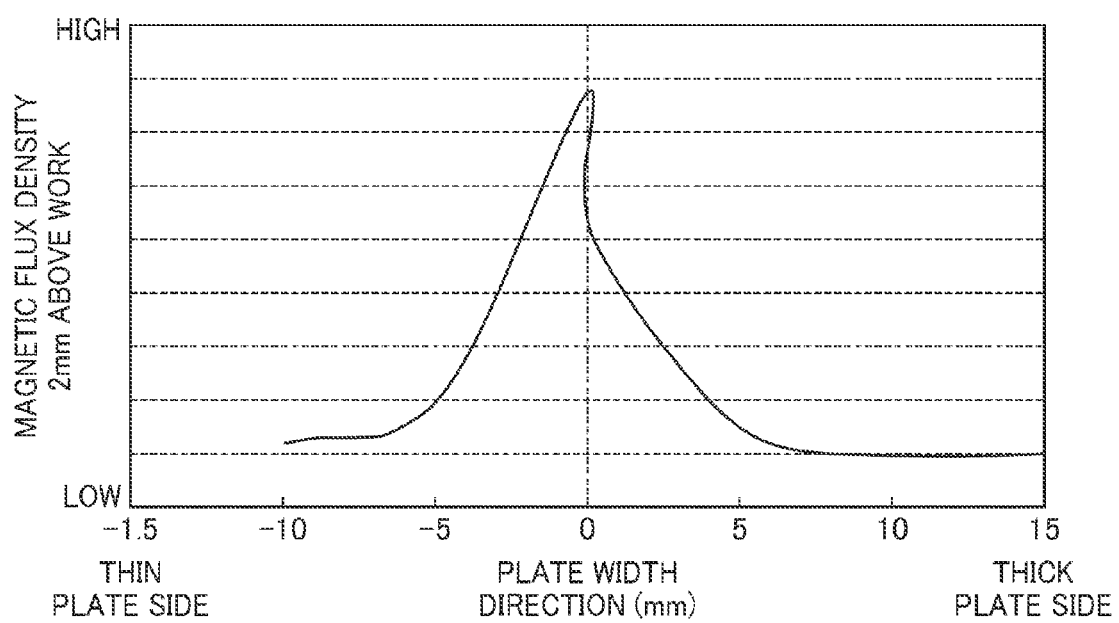
FIG. 24 is a graph showing the magnetic flux density in a plate width direction at a central part in the joining direction of a workpiece in which a thick plate and thin plate are butted together.
Figure 25:
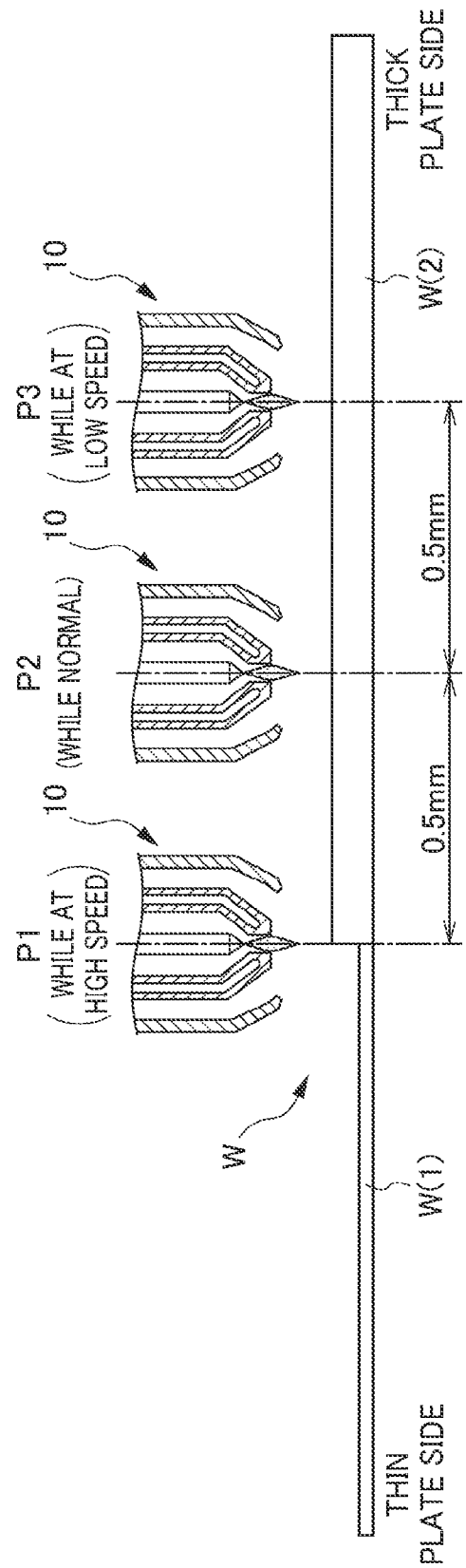
FIG. 25 is a view showing the aiming position of plasma torch in the plate width direction.

In addition, FIG. 24 is a graph showing the magnetic flux density in the plate width direction at a central part in the joining direction. As is evident also from this FIG. 24, the butting portion has the highest magnetic flux density, and the magnetic flux density declines with increasing distance from the butting portion.

With the workpiece W in which the workpiece W(1) that is a thin plate and the workpiece W(2) that is a thick plate are butted together in this way, there is a characteristic whereby a difference arises in the magnetic flux density in the plate width direction, in the case of causing the magnetic field B in the direction orthogonal to the joining direction to generate inside of the workpiece W. This characteristic is similarly confirmed in butting workpieces without a plate thickness difference; however, it is more pronounced with butting workpieces having a plate thickness difference.

Therefore, the magnetic field strength adjustment method of the present embodiment adjusts the aiming position of the plasma torch 10 in the plate width direction depending on the required magnetic flux density, using this characteristic. In other words, the magnetic field strength at the welded part is adjusted by changing the relative positions between the plasma torch 10 and the butting portion of the workpiece W.

The magnetic field strength adjustment method of the present embodiment will be explained in detail giving specific examples.

For example, the amount of the arc A swung forward in the direction of advancement changes depending on the feed rate of the plasma torch 10 (welding speed). For this reason, in order to sufficiently preheat the workpiece W, it is necessary to adjust the magnetic field strength at the welded part depending on the feed rate of the plasma torch 10.

Therefore, with the magnetic field strength adjustment method of the present embodiment, in a case quickening the feed rate of the plasma torch 10, the aiming position of the plasma torch 10 in the plate width direction is changed to a position having high magnetic flux density closer to the butting portion. For example, as shown in FIG. 25, the aiming position of the plasma torch 10 in the plate width direction is normally a position separated 0.5 mm to the thick plate side from the butting portion (P2 in FIG. 25); however, in the case of quickening the feed rate by 20%, it is changed to the butting portion having the highest magnetic flux density (P1 in FIG. 25). It is thereby possible to suppress the amount of arc A swung forward in the direction of advancement from decreasing by quickening the feed rate of the plasma torch 10 since the magnetic field strength at the welded part rises.

On the other hand, in the case of slowing the feed rate of the plasma torch 10, the aiming position of the plasma torch 10 in the plate width direction is changed to a position having low magnetic flux density further separated from the butting portion. For example, as shown in FIG. 25, in a case of slowing the feed rate by 10%, it is changed to a position (P3 in FIG. 25) separated 0.5 mm to the thick plate side from the normal position (P2 in FIG. 25). It is thereby possible to suppress the amount of the arc A swung forward in the direction of advancement from becoming excessive by slowing the feed rate of the plasma torch 10, since the magnetic field strength at the welded part decreases.

In addition, upon butt welding workpieces having different plate width, for example, the magnetic flux leaked at the surface of the workpiece W changes depending on the plate thickness difference thereof, and thus the amount of the arc A swung forward in the direction of advancement changes. For this reason, it is necessary to adjust the magnetic field strength at the welded part depending on the plate thickness difference.

Therefore, with the magnetic field strength adjustment method of the present embodiment, in a case of reducing the plate thickness difference, the aiming position of the plasma torch 10 in the plate width direction is changed to a position having high magnetic flux density closer to the butting portion. It is thereby possible to suppress the amount of the arc A swung forward in the direction of advancement from decreasing due to reducing the plate thickness difference, since the magnetic field strength at the welded part rises.

On the other hand, in the case of increasing the plate thickness difference, the aiming position of the plasma torch 10 in the plate width direction is changed to a position having low magnetic flux density further separated from the butting portion. It is thereby possible to suppress the amount of the arc A swung forward in the direction of advancement from becoming excessive due to increasing the plate thickness difference, since the magnetic field strength at the welded part decreases.

In addition, the welding current required for melting differs depending on the plate thickness of the workpiece W, for example, and thus the amount of the arc A swung forward in the direction of advancement changes according to the magnitude of the welding current. For this reason, it is necessary to adjust the magnetic field strength at the welded part depending on the plate thickness of the workpiece W.

Therefore, with the magnetic field strength adjustment method of the present embodiment, in a case of thickening the plate thickness of the workpiece W, the aiming position of the plasma torch 10 in the plate width direction is changed to a position having high magnetic flux density closer to the butting portion. It is thereby possible to suppress the welding current from increasing and the amount of the arc A swung forward in the direction of advancement decreasing due to thickening the plate thickness, since the magnetic field strength at the welded part rises.

On the other hand, in the case of thinning the plate thickness of the workpiece W, the aiming position of the plasma torch 10 in the plate width direction changes to a position of low magnetic flux density further separated from the butting portion. It is thereby possible to suppress the welding current from lowering and the amount of the arc A swung forward in the direction of advancement becoming excessive due to the plate thickness thinning, since the magnetic field strength at the welded part decreases.

Operation of the plasma arc welding device 5 adopting the magnetic field strength adjustment method of the present embodiment will be explained while referencing FIG. 22.

First, in accordance with the magnetic field strength adjustment method of the present embodiment, the aiming position of the plasma torch 10 in the plate width direction of the workpiece W is decided depending on the plate thickness of the workpiece W, plate thickness difference, welding speed, etc. After deciding, the workpiece W is clamped by the pair of clamps 34 so that the decided aiming position is arranged just below the plasma torch 10 supported to the support frame 30.

Next, the permanent magnets 23S and 23N are arranged as positions corresponding to the weld starting end by the second movement mechanism and second lift mechanism. At this time, the permanent magnets 23S and 23N are arranged through the penetrating grooves 33 to make so that a small gap is formed between the lower end surface of these and the upper surface of the workpiece W. The magnetic field B from the n-pole permanent magnet 23N through the workpiece W towards the s-pole permanent magnet 23S is thereby formed, and the magnetic field strength at the welded part is set to a desired strength.

Next, the plasma torch 10 is arranged at a position a predetermined height above the weld starting end by the first movement mechanism and the first lift mechanism.

Next, the arc A is generated by applying a voltage between the electrode 11 and workpiece W, while ejecting plasma gas from the first ejection hole 13 of the first nozzle 12. In addition, the shield gas is made to eject from the second ejection hole 15 of the second nozzle 14 so as to surround the periphery of the arc A.

Then, the leading end side of the arc A is bent forwards in the direction of advancement of the plasma torch 10 by the Lorentz force F resulting from the direction of the current I flowing in the arc A (refer to FIG. 22) and the direction of the magnetic field B leaked from the butting portion of the workpiece W.

In this state, the plasma torch 10 is made to move horizontally in the joining direction by way of the first movement mechanism. In addition, the permanent magnets 23S and 23N are made to move horizontally in the joining direction along the penetrating grooves 33 by way of the second movement mechanism. The molten pool P having a penetration depth that is thereby ensured is formed, whereby favorable welding is performed.

The following effects are exerted according to the present embodiment, in addition to the aforementioned effects of the first embodiment and the third embodiment.

(5-1) The magnetic field strength at the welded part can be adjusted by changing the relative positions between the plasma torch 10 and the butting portion of the workpiece W. In other words, since adjustment of the magnetic flux origin is not performed, it is not necessary to provide electromagnets, a power source or a controller, and it is possible to use smaller and inexpensive permanent magnets 23S and 23N. Therefore, the magnetic field strength at the welded part can be easily adjusted by only changing the relative positions between the plasma torch 10 and the butting portion of the workpiece W, while avoiding cost increases and increases in device size.

(5-2) In addition, since only the relative positions between the plasma torch 10 and the butting portion of the workpiece W are changed, the magnetic field strength at the welded part can be easily adjusted depending on the plate thickness and set of plates of the workpiece W, welding speed, etc., and favorable welding becomes possible.

(5-3) In addition, in plasma arc welding by the plasma arc welding device 5, the bead width is wide, and there is tolerance in the aiming position of the plasma torch 10 in the plate width direction of the workpiece W; therefore, the magnetic field strength adjustment method according to the present embodiment is particularly preferably adopted thereby.

Sixth Embodiment

Figure 26:
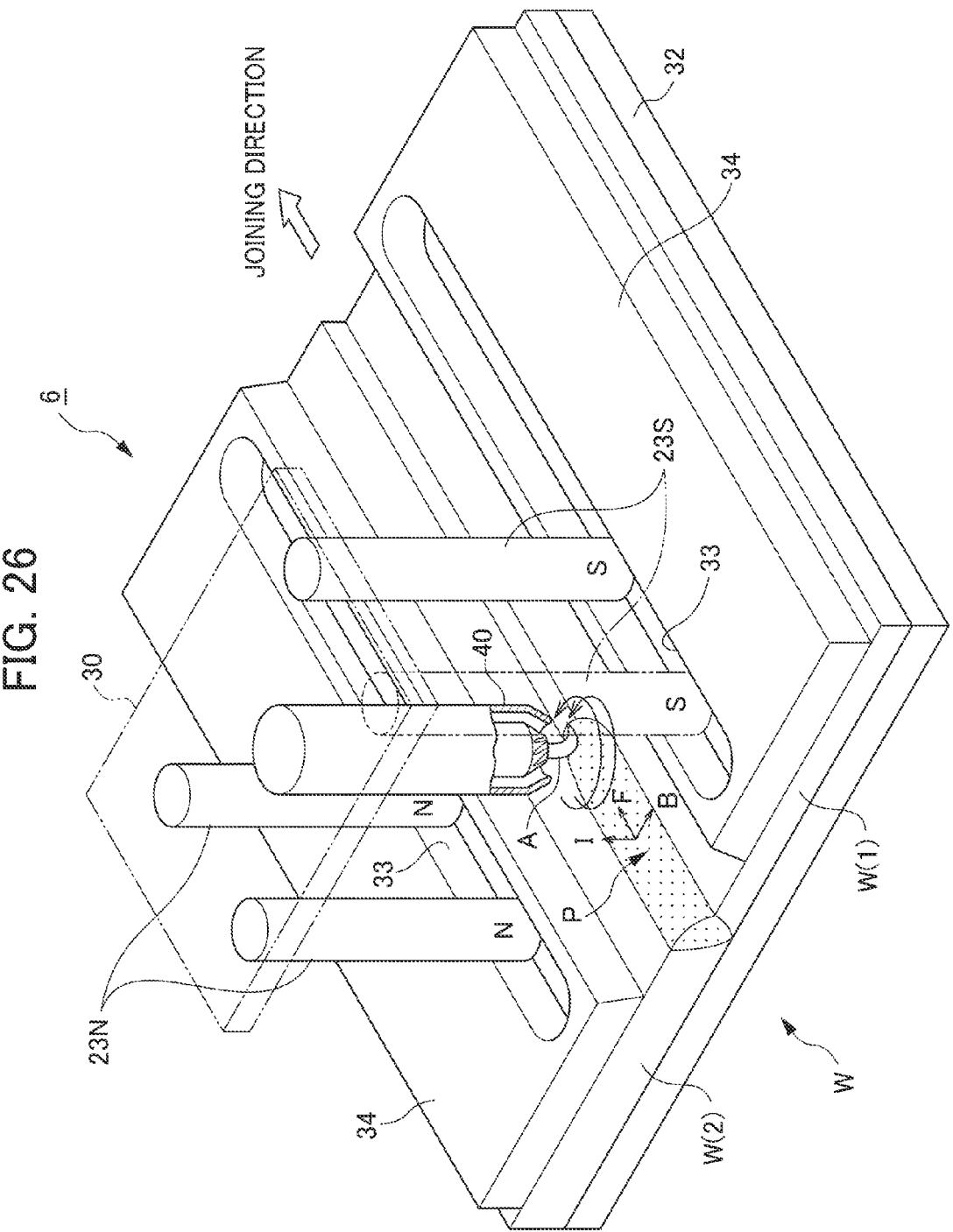
FIG. 26 is a perspective view of a plasma arc welding device according to a sixth embodiment.
Figure 27:
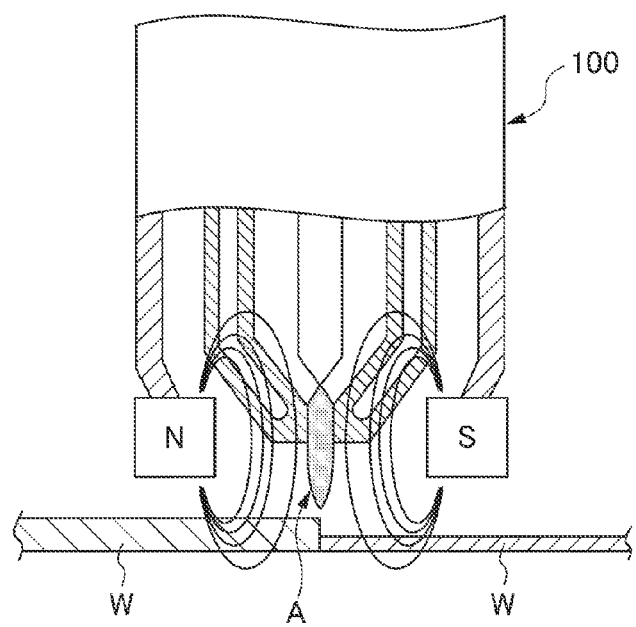
FIG. 27 is a schematic front view of a conventional plasma arc welding device.
Figure 28:
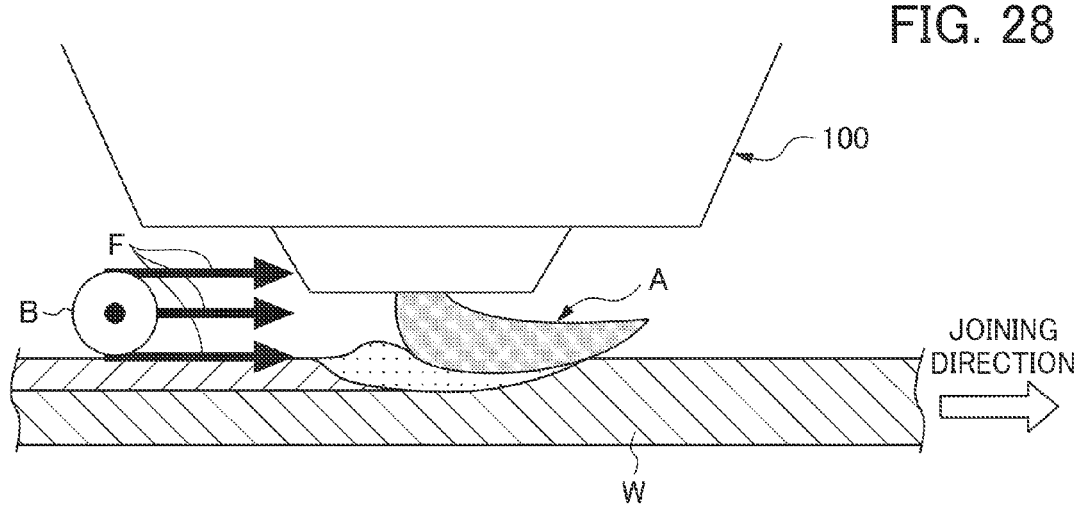
FIG. 28 is a right-side view of the plasma arc welding device shown in FIG. 27.

FIG. 26 is a perspective view of a plasma arc welding device 6 according to a sixth embodiment adopting the magnetic field strength adjustment method of the present invention.

As shown in FIG. 26, the plasma arc welding device 6 is a device in which the plasma torch 10 of the plasma arc welding device 5 according to the fifth embodiment has been changed to the plasma torch 40, and is identical to the plasma arc welding device 5 in regards to other configurations thereof.

In plasma arc welding by the plasma arc welding device 6, the aforementioned magnetic field strength adjustment method is adopted, similarly to the fifth embodiment.

Operations of the plasma arc welding device 6 adopting the aforementioned magnetic field strength adjustment method will be explained hereinafter. It should be noted that, since the configuration of the plasma torch 40 of the present embodiment is identical to the plasma torch 40 of the second embodiment, operations of the plasma arc welding device 6 will be explained while referencing FIGS. 7, 8 and 26.

First, in accordance with the aforementioned magnetic field strength adjustment method the aiming position of the plasma torch 40 in the plate width direction of the workpiece W is decided depending on the plate thickness of the workpiece W, plate thickness difference, welding speed, etc.

After deciding, the workpiece W is clamped by the pair of clamps 34 so that the decided aiming position is arranged just below the plasma torch 40 supported to the support frame 30.

Next, the permanent magnets 23S and 23N are arranged as positions corresponding to the weld starting end by the second movement mechanism and second lift mechanism. At this time, the permanent magnets 23S and 23N are arranged through the penetrating grooves 33 to make so that a small gap is formed between the lower end surface of these and the upper surface of the workpiece W. The magnetic field B from the n-pole permanent magnet 23N through the workpiece W towards the s-pole permanent magnet 23S is thereby formed, and the magnetic field strength at the welded part is set to a desired strength.

Next, the plasma torch 40 is arranged at a position a predetermined height above the welding start end by the first movement mechanism and the first lift mechanism.

Next, the arc A is generated by applying a voltage between the electrode 41 and workpiece W, while ejecting plasma gas from the first ejection hole 43 of the first nozzle 42. In addition, the shield gas is made to eject from the second ejection hole 48 of the second nozzle 47 so as to surround the periphery of the arc A.

Then, the shield gas flows along the plurality of grooves 46 in the direction of the white arrows in FIG. 7, and ejects from the second ejection hole 48. This ejected shield gas flows in a spiral along the surface of the arc A, while spreading in a direction away from the arc A, and is blown against the surface of the molten pool P in a direction revolving about the arc A, i.e. direction of black arrows in FIG. 7.

More specifically, as shown in FIG. 8, the shield gas is blown against the eight locations on the workpiece W(1) and workpiece W(2), and the flow direction of the shield gas at each location becomes as shown by the black arrow in FIG. 8.

In addition, the leading end side of the arc A is bent forwards in the direction of advancement of the plasma torch 10 by the Lorentz force F resulting from the direction of the current I flowing in the arc A (refer to FIG. 26) and the direction of the magnetic field B leaked from the butting portion of the workpieces W.

In this state, the plasma torch 40 is made to move horizontally in the joining direction by way of the first movement mechanism. In addition, the permanent magnets 23S and 23N are made to move horizontally in the joining direction along the penetrating grooves 33 by way of the second movement mechanism. Then, the molten pool P having sufficient penetration depth thereby ensured is formed so as to extend ahead and behind the arc A in a plan view, as shown in FIG. 8.

In addition, the molten metal in a region surrounded by the dotted line in FIG. 8 at the rear side in the direction of advancement of the arc A moves by being pushed by the blown shield gas from the thick plate of the workpiece W(2) to the thin plate of the workpiece W(1). Favorable welding is thereby performed while a concaved portion of the welding base metal of the thin plate of the workpiece W(1) is filled by this molten metal thus moved.

The following effect is exerted according to the present embodiment, in addition to the aforementioned effects of the first embodiment to the fifth embodiment.

(6-1) According to the present embodiment, the bead width further widens by the shield gas flowed in a spiral from the second ejection hole 48 of the second nozzle 47, and thus there is further tolerance in the aiming position of the plasma torch 40 in the plate width direction; therefore, the aforementioned magnetic field strength adjustment method is more preferably adopted thereby.

It should be noted that the present invention is not to be limited to the aforementioned respective embodiments, and that modifications, improvements, etc. within a scope that can achieve the objects of the present invention are included in the present invention.

For example, either of electromagnets and permanent magnets are acceptable as the magnetic field generating mechanism that generates a magnetic field in the workpiece, and it is possible to modify these as appropriate.

In addition, the type of arc welding is not limited to plasma arc welding, and may be TIG arc welding, for example.

Furthermore, in the fifth embodiment and sixth embodiment, although the magnetic field strength at the welded part is adjusted by shifting the clamping position of the workpiece, it is not limited thereto. The magnetic field strength at the welded part may be adjusted by shifting the position of the plasma torch relative to the clamped workpiece in the plate width direction by way of the first movement mechanism.

The invention claimed is:

1. A method of arc welding using an arc torch to conduct arc welding on two workpieces of different thicknesses, the two workpieces of different thicknesses being butted together so as to have different heights on a surface to be arc welded, the method comprising:
generating, inside of the workpieces, a magnetic field in a direction substantially orthogonal to a joining direction in which the arc torch advances;
welding by bending a leading end side of an arc forwards in a direction of advancement of the arc torch by way of Lorentz force resulting from current flowing between the arc torch and the workpieces, and the magnetic field;
extending a molten pool formed by the arc to a front and rear of the arc in a plan view in the direction of advancement of the arc torch, by making the arc torch move in the joining direction during welding; and
causing molten metal in a region at a rear side in the direction of advancement of the arc torch to move towards a thinner workpiece of the two workpieces of different thicknesses, by ejecting shield gas flowing in a spiral from the arc torch in a direction revolving about the arc against a surface of the molten pool formed by the arc.

2. The method of arc welding according to claim 1, comprising:
generating the magnetic field by disposing magnets on both sides of a joining line of the workpieces at positions at which an influence by magnetism acting inside of the workpieces is greater than an influence acting on the arc.

3. The method of arc welding according to claim 1, comprising:
conducting the arc welding in a state in which the workpieces are fixed to a non-magnetic jig.

4. The method of arc welding according to claim 1, comprising:
processing at a temperature at which a welded part of the workpieces exceeds the Curie point.

5. An arc welding device comprising:
an arc torch that conducts arc welding on two workpieces of different thicknesses, the two workpieces of different thicknesses being butted together so as to have different heights on a surface to be arc welded; and
a magnetic field generating mechanism that generates, inside of the workpieces, a magnetic field in a direction orthogonal to a joining direction in which the arc torch advances, the magnetic field bending a leading end side of an arc forwards in a direction of advancement of the arc torch, by way of Lorentz force resulting from the magnetic field and current flowing between the arc torch and the workpieces,
wherein the arc torch extends a molten pool formed by the arc to a front and rear of the arc in a plan view in the direction of advancement of the arc torch, by moving in a joining direction during welding, and
the arc torch comprises an ejection hole that, during welding, causes molten metal in a region at a rear side in the direction of advancement of the arc torch to move towards a thinner workpiece of the two workpieces of different thicknesses, by ejecting shield gas flowing in a spiral from the arc torch in a direction revolving about the arc against a surface of the molten pool formed by the arc.

6. The arc welding device according to claim 5, further comprising a non-magnetic jig that fixes the workpieces.

7. An arc welding magnetic field strength adjustment method for adjusting a magnetic field strength at a welded part in arc welding to weld two butting workpieces of different thicknesses by way of an arc torch, the two butting workpieces of different thicknesses being butted together so as to have different heights on a surface to be arc welded, when generating inside of the workpieces a magnetic field in a direction substantially orthogonal to a joining direction in which the arc torch advances, and arc welding by bending a leading end side of an arc forwards in a direction of advancement of the arc torch, by way of Lorentz force resulting from current flowing between the arc torch and the workpieces, and the magnetic field, the method comprising adjusting the magnetic field strength at the welded part by:
during welding, extending a molten pool formed by the arc to a front and rear of the arc in a plan view in the direction of advancement of the arc torch, by making the arc torch move in the joining direction, and causing molten metal in a region at a rear side in the direction of advancement of the arc torch to move towards a thinner workpiece of the two workpieces of different thicknesses, by ejecting shield gas flowing in a spiral from the arc torch in a direction revolving about the arc against a surface of a molten pool formed by the arc, and
changing relative positions between the arc torch and a butting portion of the workpieces.

8. The method of arc welding according to claim 1, wherein arc welding is performed with the arc torch facing first surfaces of the two workpieces which are adjacent to second surfaces of the two workpieces, the second surfaces of the two workpieces facing and being butted together, and the first surface of a thicker workpiece of the two workpieces being staggered in a height direction relative to the first surface of the thinner workpiece of the two workpieces.

9. The method of arc welding according to claim 8, further comprising:
prior to generating the magnetic field, butting the second surfaces of the two workpieces together; and
prior to welding, causing the arc torch to face the first surfaces of the two workpieces.

10. The method of arc welding according to claim 1, further comprising:

prior to generating the magnetic field, butting the two workpieces of different thicknesses together so as to have different heights on the surface to be arc welded; and prior to welding, causing the arc torch to face the surface to be arc welded.

11. The arc welding device according to claim 5, wherein the arc torch is configured to face first surfaces of the two workpieces which are adjacent to second surfaces of the two workpieces, the second surfaces of the two workpieces facing and being butted together, and the first surface of a thicker workpiece of the two workpieces being staggered in a height direction relative to the first surface of the thinner workpiece of the two workpieces.

12. The arc welding magnetic field strength adjustment method according to claim 7, wherein arc welding is performed with the arc torch facing first surfaces of the two workpieces which are adjacent to second surfaces of the two workpieces, the second surfaces of the two workpieces facing and being butted together, and the first surface of a thicker workpiece of the two workpieces being staggered in a height direction relative to the first surface of the thinner workpiece of the two workpieces.

* * * * *